(12) United States Patent
Nozaki et al.

(10) Patent No.: US 11,697,698 B2
(45) Date of Patent: Jul. 11, 2023

(54) METHOD FOR PRODUCING COPOLYMER OF ALLYL MONOMER HAVING POLAR GROUP

(71) Applicants: The University of Tokyo, Tokyo (JP); SHOWA DENKO K. K., Tokyo (JP); Japan Polyethylene Corporation, Tokyo (JP)

(72) Inventors: Kyoko Nozaki, Tokyo (JP); Shingo Ito, Tokyo (JP); Junichi Kuroda, Oita (JP); Yoshikuni Okumura, Oita (JP); Shinya Hayashi, Oita (JP); Minoru Kobayashi, Yokkaichi (JP); Yuichiro Yasukawa, Kawasaki (JP)

(73) Assignees: THE UNIVERSITY OF TOKYO, Tokyo (JP); SHOWA DENKO K.K., Tokyo (JP); JAPAN POLYETHYLENE CORPORATION, Tokyo (JP)

(*) Notice: Subject to any disclaimer, the term of this patent is extended or adjusted under 35 U.S.C. 154(b) by 384 days.

(21) Appl. No.: 17/046,036

(22) PCT Filed: Mar. 7, 2019

(86) PCT No.: PCT/JP2019/009072
§ 371 (c)(1),
(2) Date: Oct. 8, 2020

(87) PCT Pub. No.: WO2019/207969
PCT Pub. Date: Oct. 31, 2019

(65) Prior Publication Data
US 2021/0040251 A1 Feb. 11, 2021

(30) Foreign Application Priority Data
Apr. 25, 2018 (JP) .................................. 2018-083743

(51) Int. Cl.
*C08F 4/80* (2006.01)
*C08F 4/52* (2006.01)
*C08F 210/02* (2006.01)
*C08F 218/12* (2006.01)
*C08F 4/70* (2006.01)
*C08F 218/10* (2006.01)
(Continued)

(52) U.S. Cl.
CPC ............. *C08F 210/02* (2013.01); *C08F 4/52* (2013.01); *C08F 4/7062* (2013.01); *C08F 4/7098* (2013.01); *C08F 4/80* (2013.01); *C08F 218/10* (2013.01); *C08K 5/0091* (2013.01); *C08K 5/55* (2013.01)

(58) Field of Classification Search
CPC .. C08F 4/80; C08F 4/52; C08F 210/02; C08F 218/12
See application file for complete search history.

(56) References Cited

U.S. PATENT DOCUMENTS 8,889,805 B2 11/2014 Ito et al.
8,916,663 B2 12/2014 Nozaki et al.
(Continued)

FOREIGN PATENT DOCUMENTS

JP 2011-068881 A 4/2011
JP 2014-159540 A 9/2014
(Continued)

OTHER PUBLICATIONS

R.C. Laible, "Allyl Polymerizations", Chem. Rev., 1958, pp. 808-843, vol. 58.
(Continued)

*Primary Examiner* — Rip A Lee
(74) *Attorney, Agent, or Firm* — Sughrue Mion, PLLC

(57) ABSTRACT

The present invention pertains to a method for producing a copolymer of ethylene and an allyl monomer having a polar group represented by general formula (1), or a copolymer of ethylene, an allyl monomer having a polar group represented by general formula (1), and other monomers, wherein the copolymer is produced in the presence of a boron compound having a boron-hydrogen bond or a boron-carbon bond (for example, a compound represented by general formula (2)) by using a metal complex represented by general formula (C1) as a polymerization catalyst (the symbols in the formulas are as described in the description). According to the present invention, a copolymer of ethylene and an allyl monomer can be efficiently produced with high catalytic activity, wherein the copolymer has a polar group and can be used in various applications.

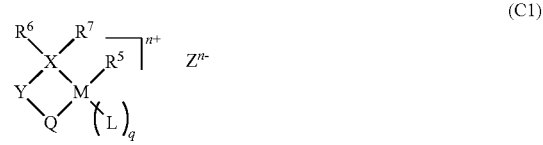

(C1)

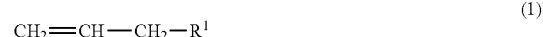

(1)

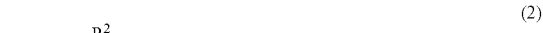

(2)

16 Claims, No Drawings

(51) Int. Cl.
    *C08K 5/00*     (2006.01)
    *C08K 5/55*     (2006.01)

(56) References Cited

U.S. PATENT DOCUMENTS

| | | | |
|---|---|---|---|
| 9,284,390 B2 * | 3/2016 | Nozaki | C08F 210/02 |
| 9,303,101 B2 | 4/2016 | Nozaki et al. | |
| 9,499,644 B2 * | 11/2016 | Ito | C08F 4/80 |
| 9,796,812 B2 * | 10/2017 | Hosokawa | C08F 24/00 |
| 10,414,837 B2 * | 9/2019 | Nozaki | C08F 4/80 |
| 11,248,074 B2 * | 2/2022 | Ito | C08F 4/80 |
| 11,352,453 B2 * | 6/2022 | Nozaki | C07F 15/006 |
| 2017/0313792 A1 | 11/2017 | Nozaki et al. | |

FOREIGN PATENT DOCUMENTS

| | | |
|---|---|---|
| WO | 2012/029432 A1 | 3/2012 |
| WO | 2013/168626 A1 | 11/2013 |
| WO | 2016/067776 A1 | 5/2016 |

OTHER PUBLICATIONS

Shingo Ito, et al., "Coordination-Insertion Copolymerization of Allyl Monomers with Ethylene", Journal of the American Chemical Society, ACS Publications, 2011, pp. 1232-1235, vol. 133.
International Search Report for PCT/JP2019/009072 dated Jun. 4, 2019 (PCT/ISA/210).

* cited by examiner

METHOD FOR PRODUCING COPOLYMER OF ALLYL MONOMER HAVING POLAR GROUP

CROSS REFERENCE TO RELATED APPLICATIONS

This application is a National Stage of International Application No. PCT/JP2019/009072 filed Mar. 7, 2019, claiming priority based on Japanese Patent Application No. 2018-083743 filed Apr. 25, 2018.

FIELD

The present invention relates to a method for producing a copolymer of an allyl monomer having a polar group.

BACKGROUND

Copolymers of olefins, such as ethylene and propylene, which are nonpolar monomers, and vinyl monomers having a polar group, have functionality and characteristics which are not found in nonpolar polyethylene and polypropylene, and are used in a wide range of fields. For example, an ethylene-vinyl alcohol copolymer (EVOH) is a copolymer composed of an ethylene monomer structural unit and a vinyl alcohol monomer structural unit, and is produced by saponifying an ethylene-vinyl acetate copolymer obtained by radical copolymerization of ethylene and vinyl acetate. EVOH is used in a wide range of fields, such as food packaging applications, by utilizing its excellent gas-barrier properties.

On the other hand, polymerization of an allyl monomer having a polar group, such as allyl acetate or allyl alcohol, is more difficult than that of an ordinary vinyl monomer, and polymers thereof are hardly known. The reason for this is that when the allyl monomer is radically polymerized, the growth reaction of the polymer is extremely slow because of the degradative chain transfer reaction to the monomer by abstraction of a hydrogen atom present on the allylic carbon, and only oligomers with a low degree of polymerization are obtained (Chem. Rev. 58, 808 (1958); NPL 1).

JP 2011-68881 A (PTL 1), WO 2013/168626 (PTL 2) and J. Am. Chem. Soc., 133, 1232 (2011) (NPL 2) disclose coordination copolymerization of ethylene and a polar group-containing allyl monomer using a metal complex catalyst of Group 10 of the Periodic Table, and have succeeded in the synthesis of a copolymer of a polar group-containing allyl monomer, which has not been obtained by a radical polymerization method. In addition, JP 2014-159540 A (PLT 3) and WO 2016/067776 (PLT 4) disclose that the catalysts described in the above documents can be further improved to produce a polymer having a molecular weight which can be molded into various molded articles. However, catalytic activity and polymer productivity per unit catalyst are not sufficient, and challenges remain in terms of catalyst cost toward industrialization.

CITATION LIST

Patent Literature

[PTL 1] JP 2011-68881 A (U.S. Pat. Nos. 8,916,663, 9,284,390)
[PTL 2] WO 2013/168626 (U.S. Pat. No. 9,303,101)
[PTL 3] JP 2014-159540 A (U.S. Pat. No. 9,499,644)
[PTL 4] WO 2016/067776 (US 2017/0313792 A1)

Non-Patent Literature

[NPL 1] Chem. Rev. 58, 808 (1958)
[NPL 2] J. Am. Chem. Soc., 133, 1232 (2011)

SUMMARY

Technical Problem

It is an object of the present invention to provide a method capable of more efficiently producing a copolymer of an allyl monomer having a polar group using a metal complex of Group 10 of the Periodic Table as a catalyst.

Solution to Problem

As a result of intensive studies to solve the aforementioned problems, the present inventors have found that a copolymer of an allyl monomer having a polar group capable of being applied to various applications can be produced with high catalytic activity by copolymerizing ethylene and an allyl monomer having a polar group in the coexistence of a boron compound having one or more boron-hydrogen bonds (B—H) or boron-carbon bonds (B—C) by using a metal complex of Group 10 of the Periodic Table as a catalyst, thereby completing the present invention.

That is, the present invention relates to a method for producing a copolymer of the following [1] to [14].

[1] A method for producing a copolymer of ethylene and an allyl monomer having a polar group represented by formula (1)

$$CH_2=CH-CH_2-R^1 \quad (1),$$

wherein $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms (oxycarbonyl group; R—O—(C=O)—, R is an organic group), an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom, or a copolymer of ethylene, the allyl monomer having a polar group represented by formula (1) and another monomer, the method characterized by using a metal complex represented by formula (C1)

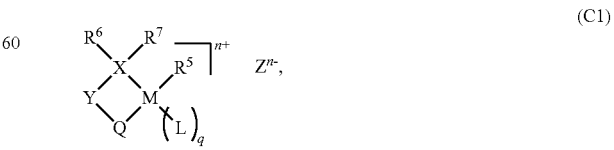

wherein M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—SiH$_2$—), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O, wherein R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group, wherein the bonding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M, R$^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms, R$^6$ and R$^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure, L represents an electron-donating ligand and R$^5$ and L may form a ring, q is 0, ½, 1 or 2, n represents the number of charges of an organometallic compound and is 0 or 1, Z$^{n-}$ represents a counteranion of a cationic organometallic compound, and is absent when n is 0, as a catalyst and by allowing a boron compound having one or more boron-hydrogen bonds (B—H) or boron-carbon bonds (B—C) to coexist during polymerization.

[2] The method for producing a copolymer as described in [1], wherein the boron compound having one or more boron-hydrogen bonds (B—H) or boron-carbon bonds (B—C) is a borane compound, a boroxine compound, a boronic acid compound, a boronic ester compound, a borinic acid compound, or a borinic ester compound.

[3] The method for producing a copolymer as described in [1] or [2], wherein the boron compound having one or more boron-hydrogen bonds (B—H) or boron-carbon bonds (B—C) is a boroxine compound represented by formula (2)

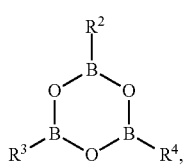

(2)

wherein R$^2$, R$^3$ and R$^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, a substituted or unsubstituted aryl group having 6 to 30 carbon atoms, and an acyloxy group having 2 to 10 carbon atoms, and at least one of R$^2$, R$^3$ and R$^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

[4] The method for producing a copolymer as described in [3], wherein R$^2$, R$^3$ and R$^4$ in formula (2) are each independently a hydrogen atom, a substituted or unsubstituted alkyl group having 1 to 30 carbon atoms, or a substituted or unsubstituted aryl group having 6 to 30 carbon atoms.

[5] The method for producing a copolymer as described in any one of [1] to [4], wherein a metal complex wherein n is 0 and Q is Q$^1$ in formula (C1), that is, a metal complex represented by formula (C2)

(C2)

wherein X, Y, M, L, q, R$^5$, R$^6$ and R$^7$ represent the same meanings as described in formula (C1) and Q$^1$ represents an anionic ligand selected from —S(=O)$_2$—O—, —C(=O)—O—, —P(=O)(—OH)—O—, —O—, and —S—, is used.

[6] The method for producing a copolymer as described in [5], wherein a metal complex wherein Q$^1$ in formula (C2) is —S(=O)$_2$—O—, that is, a metal complex represented by formula (C4)

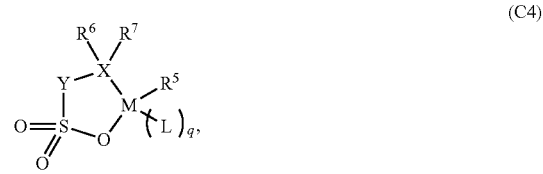

(C4)

wherein X, Y, M, L, q, R$^5$, R$^6$ and R$^7$ represent the same meanings as described in formula (C1), is used.

[7] The method for producing a copolymer as described in [5] or [6], wherein Y in formula (C2) is a substituted or unsubstituted phenylene group, a substituted or unsubstituted methylene group, or a substituted or unsubstituted imino group.

[8] The method for producing a copolymer as described in any one of [5] to [7], wherein R$^6$ and R$^7$ in formula (C2) are both an alkyl group having 3 to 20 carbon atoms.

[9] The method for producing a copolymer as described in any one of [1] to [4], wherein a metal complex wherein n is 1 and Q is Q$^2$ in formula (C1), that is, a metal complex represented by formula (C3)

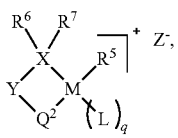

(C3)

wherein X, Y, M, L, q, $R^5$, $R^6$, $R^7$, and Z have the same meanings as described in formula (C1), and $Q^2$ represents a neutral ligand selected from —P(—$R^8$)(—$R^9$)=O, and —C(—$R^{10}$)=O, wherein $R^8$, $R^9$ and $R^{10}$ represent the same meanings as described in formula (C1), is used.

[10] The method for producing a copolymer as described in [9], wherein Y in formula (C3) is a substituted or unsubstituted phenylene group, a substituted or unsubstituted methylene group, or a substituted or unsubstituted imino group.

[11] The method for producing a copolymer as described in [9] or [10], wherein $R^6$ and $R^7$ in formula (C3) are both an alkyl group having 3 to 20 carbon atoms.

[12] The method for producing a copolymer as described in any one of [1] to [4] and [9] to [11], wherein Z in formula (C1) and formula (C3) is one selected from $SbF_6$, $BPh_4$, $BArF_4$ ($ArF_4$=[3,5-$(CF_3)_2C_6H_3$]$_4$), $BF_4$ and $PF_6$.

[13] The method for producing a copolymer as described in any one of [1] to [12], wherein the allyl monomer having a polar group represented by formula (1) is allyl acetate ($R^1$ in formula (1) is an acetoxy group ($CH_3C$(=O)—O—)).

[14] The method for producing a copolymer as described in any one of [1] to [13], wherein, in a copolymerization reaction of ethylene and the allyl monomer having a polar group represented by formula (1), or in a copolymerization reaction of ethylene, the allyl monomer having a polar group represented by formula (1), and another monomer, the boron compound having one or more boron-hydrogen bonds or boron-carbon bonds is added by continuous feed or intermittent feed after the start of the polymerization reaction.

Advantageous Effects of Invention

Using the metal complex of Group 10 of the Periodic Table as a catalyst, a copolymer of ethylene and an allyl monomer having a polar group can be produced with high catalytic activity, and a production cost can be reduced.

DESCRIPTION OF EMBODIMENTS

[Catalyst]

The structure of a catalyst comprising a metal complex of Group 10 of the Periodic Table used in the present invention is represented by formula (C1).

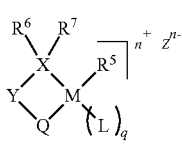

(C1)

In the formula, M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—$SiH_2$—). Q represents an anionic ligand selected from —S(=O)$_2$—O—, —C(=O)—O—, —P(=O)(—OH)—O—, —O—, and —S—, or a neutral ligand selected from —P(—$R^8$)(—$R^9$)=O, and —C(—$R^{10}$)=O. $R^8$, $R^9$ and $R^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. In this case, the bonding mode is Y—S(=O)$_2$—O-M, Y—C(=O)—O-M, Y—P(=O)(—OH)—O-M, Y—O-M, Y—S-M, Y—P(—$R^8$)(—$R^9$)=O-M, or Y—C(—$R^{10}$)=O-M. $R^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms. $R^6$ and $R^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure. L represents an electron-donating ligand, and $R^5$ and L may form a ring. q is 0, ½, 1 or 2. n represents the number of charges of an organometallic compound, and is 0 or 1. $Z^{n-}$ represents a counteranion of a cationic organometallic compound, and is absent when n is 0.

As used herein, "hydrocarbon" includes saturated and unsaturated aliphatic hydrocarbons and aromatic hydrocarbons.

Hereinafter, the structure of formula (C1) will be described.

M represents an element of Group 10 of the Periodic Table. Examples of the element of Group 10 of the Periodic Table include Ni, Pd, and Pt, and Ni and Pd are preferable from the viewpoint of catalytic activity and the molecular weight of an obtained polymer, and Pd is more preferable.

X is a phosphorus atom (P) or an arsenic atom (As), and is two-electron coordinated to the central metal M. X is preferably P from the viewpoint of availability and catalyst cost.

Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—$SiH_2$—).

Examples of unsubstituted arylene groups having 6 to 30 carbon atoms include a 1,2-phenylene group, a 1,2-naphthylene group, a 2,3-naphthylene group, and a 1,8-naphthylene group, and a 1,2-phenylene group and a 1,2-naphthylene group are preferable in view of availability of a raw material and easy synthesis of a catalyst.

One or more substituents may be present in the aforementioned unsubstituted arylene group. Specific examples of substituents include a methyl group, an ethyl group, a 1-propyl group, an isopropyl group, a 1-butyl group, an isobutyl group, a sec-butyl group, a t-butyl group, a phenyl group, a 2-methoxyphenyl group, a 3-methoxyphenyl group, a 4-methoxyphenyl group, a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 1-naphthyl group, a 2-naphthyl group, a 1-anthracenyl group, a 2-anthracenyl group, a 9-anthracenyl group, a methoxy group, an ethoxy group, a propoxy group, an isopropoxy group, a butoxy group, an isobutoxy group, a sec-butoxy group, a t-butoxy group, a phenoxy group, an amino group, a monomethylamino group, a monoethylamino group, a mono(n-propyl)amino group, a mono(isopropyl)amino group, a mono(n-butyl)amino group, a mono(isobutyl)amino group, a mono(sec-butyl)amino group, a mono(t-butyl)amino group, a dimethylamino group, a diethylamino group, a di(n-propyl)amino group, a diisopropylamino group, a di(n-butyl)amino group, a di(isobutyl)amino group, a di(sec-butyl)amino group, a di(t-butyl)amino group, a monophenylamino group, a monobenzylamino group, a trimethylsilyl group, a triethylsilyl group, a tri(n-propyl)silyl group, a tri(isopropyl)silyl group, a t-butyldimethylsilyl group, a t-butyldiphenylsilyl group, a fluoro group, a bromo group, a chloro group, an iodo group, a trifluoromethyl group, a pentafluoroethyl group, a heptafluoropropyl group, and a nonafluorobutyl group. When a plurality of substituents are present, they may be the same or different.

Examples of unsubstituted alkylene groups having 1 to 20 carbon atoms include a methylene group, a 1,2-ethylene group, a dimethylmethylene group, a diethylmethylene group, a monomethylmethylene group, a monoethylmethylene group, a 1-methyl-1,2-ethylene group, a 1-ethyl-1,2-ethylene group, a 1,2-dimethyl-1,2-ethylene group, a 1,2-diethyl-1,2-ethylene group, a 1,1-dimethyl-1,2-ethylene group, a 1,1-diethyl-1,2-ethylene group, a 1,1,2-trimethyl-1,2-ethylene group, a 1,1,2-triethyl-1,2-ethylene group, a 1,1,2,2-tetramethyl-1,2-ethylene group, and a 1,1,2,2-tetraethyl-1,2-ethylene group.

One or more substituents may be present in the aforementioned unsubstituted alkylene group. Examples of substituents include an aryl group, an alkoxy group, an aryloxy group, a silyl group, and an oxo group (=O).

Specific examples of substituted alkylene groups having 1 to 20 carbon atoms include a diphenylmethylene group, a monophenylmethylene group, a mono(trimethylsilyl)methylene group, a di(trimethylsilyl)methylene group, a di(2-methoxyphenyl)methylene group, a mono(2-methoxyphenyl)methylene group, a di(3-methoxyphenyl)methylene group, a mono(3-methoxyphenyl)methylene group, a di(4-methoxyphenyl)methylene group, a mono(4-methoxyphenyl)methylene group, a di(2,6-dimethoxyphenyl)methylene group, a mono(2,6-dimethoxyphenyl)methylene group, a di(2,5-dimethoxyphenyl)methylene group, a mono(2,5-dimethoxyphenyl)methylene group, a di(2,4-dimethoxyphenyl)methylene group, a mono(2,4-dimethoxyphenyl)methylene group, a di(2,3-dimethoxyphenyl)methylene group, a mono(2,3-dimethoxyphenyl)methylene group, a di(3,5-dimethoxyphenyl)methylene group, a mono(3,5-dimethoxyphenyl)methylene group, a di(2,4,6-trimethoxyphenyl)methylene group, a mono(2,4,6-trimethoxyphenyl)methylene group, a di(2,4,6-trimethylphenyl)methylene group, a mono(2,4,6-trimethylphenyl)methylene group, a di(2-isopropylphenyl)methylene group, a mono(2-isopropylphenyl)methylene group, a di(2,6-diisopropylphenyl)methylene group, a mono(2,6-diisopropylphenyl)methylene group, a di(1-naphthyl)methylene group, a mono(1-naphthyl)methylene group, a di(2-naphthyl)methylene group, a mono(2-naphthyl)methylene group, a dimethoxymethylene group, a diethoxymethylene group, a dipropoxymethylene group, a diisopropoxymethylene group, a monophenoxymethylene group, a diphenoxymethylene group, a 1,2-ethanedioxymethylene group, a 1,3-propanedioxymethylene group, a 1-phenyl-1,2-ethylene group, a 1,2-diphenyl-1,2-ethylene group, a 1,1,2-triphenyl-1,2-ethylene group, a 1,1,2,2-tetraphenyl-1,2-ethylene group, and a carbonyl (—C(=O)—) group.

The substituted or unsubstituted alkylene group having 1 to 20 carbon atoms is preferably a methylene group, a monomethylmethylene group, a dimethylmethylene group, a diphenylmethylene group, or a monophenylmethylene group, from the viewpoint of availability of a raw material and easy synthesis of a catalyst.

Examples of unsubstituted cycloalkylene groups having 3 to 30 carbon atoms include a cis-cyclopropane-1,2-yl group, a trans-cyclopropane-1,2-yl group, a cis-cyclobutane-1,2-yl group, a trans-cyclobutane-1,2-yl group, a cis-cyclopentane-1,2-yl group, a trans-cyclopentane-1,2-yl group, a cis-cyclohexane-1,2-yl group, a trans-cyclohexane-1,2-yl group, a cis-cycloheptane-1,2-yl group, a trans-cycloheptane-1,2-yl group, a cis-cyclooctane-1,2-yl group, and a trans-cyclooctane-1,2-yl group. A cis-cyclopentane-1,2-yl group, a trans-cyclopentane-1,2-yl group, a cis-cyclohexane-1,2-yl group, and a trans-cyclohexane-1,2-yl group are preferable in view of availability of a raw material and easy synthesis of a catalyst.

One or more substituents may be present in aforementioned the unsubstituted cycloalkylene group. Specific examples of the substituents are the same as the above specific examples of the substituent when the substituent is present in the unsubstituted arylene group. When a plurality of substituents are present, they may be the same or different.

Examples of substituents in the substituted or unsubstituted imino group (—NH—) include an alkyl group having 1 to 5 carbon atoms, an alkoxycarbonyl group having 2 to 10 carbon atoms, an aryl group having 6 to 20 carbon atoms which may have an alkyl group or an alkoxy group, and an aralkyl group having 6 to 20 carbon atoms.

Specific examples of substituted or unsubstituted imino groups (—NH—) include an imino group, an N-methylimino group, an N-ethylimino group, an N-(n-propyl)imino group, an N-isopropylimino group, an N-(n-butyl)imino group, an N-(sec-butyl)imino group, an N-(t-butyl)imino group, an N-benzylimino group, an N-phenylimino group, an N-trimethylsilylimino group, an N-(2-methoxyphenyl)imino group, an N-(3-methoxyphenyl)imino group, an N-(4-methoxyphenyl)imino group, an N-(2,6-dimethoxyphenyl)imino group, an N-(2,5-dimethoxyphenyl)imino group, an N-(2,4-dimethoxyphenyl)imino group, an N-(2,3-dimethoxyphenyl)imino group, an N-(3,5-dimethoxyphenyl)imino group, an N-(2,4,6-trimethoxyphenyl)imino group, an N-(2,4,6-trimethylphenyl)imino group, an N-(1-naphthyl)imino group, an N-(2-naphthyl)imino group, and an N-(t-butoxycarbonyl)imino group.

An imino group, an N-methylimino group, an N-benzylimino group, and an N-(t-butoxycarbonyl)imino group are preferable in view of easy synthesis of a catalyst.

Examples of substituted or unsubstituted silylene groups (—SiH$_2$—) include a silylene group, a dimethylsilylene group, a diethylsilylene group, a monomethylsilylene group, a monoethylsilylene group, a diphenylsilylene group, a monophenylsilylene group, a mono(trimethylsilyl)silylene group, a di(trimethylsilyl)silylene group, a di(2-methoxyphenyl)silylene group, a mono(2-methoxyphenyl)silylene group, a di(3-methoxyphenyl)silylene group, a mono(3-methoxyphenyl)silylene group, a di(4-methoxyphenyl)silylene group, a mono(4-methoxyphenyl)silylene group, a di(2,6-dimethoxyphenyl)silylene group, a mono(2,6-dimethoxyphenyl)silylene group, a di(2,5-dimethoxyphenyl)silylene group, a mono(2,5-dimethoxyphenyl)silylene group, a di(2,4-dimethoxyphenyl)silylene group, a mono(2,4-dimethoxyphenyl)silylene group, a di(2,3-dimethoxyphenyl)silylene group, a mono(2,3-dimethoxyphenyl)silylene group, a di(3,5-dimethoxyphenyl)silylene group, a mono(3,5-dimethoxyphenyl)silylene group, a di(2,4,6-trimethoxyphenyl)silylene group, a mono(2,4,6-trimethoxyphenyl)silylene group, a di(2,4,6-trimethylphenyl)silylene group, a mono(2,4,6-trimethylphenyl)silylene group, a di(2-isopropylphenyl)silylene group, a mono(2-isopropylphenyl)silylene group, a di(2,6-diisopropylphenyl)silylene group, a mono(2,6-diisopropylphenyl)silylene group, a di(1-naphthyl)silylene group, a mono(1-naphthyl)silylene group, a di(2-naphthyl)silylene group, a mono(2-naphthyl)silylene group, a dimethoxysilylene group, a diethoxysilylene group, a dipropoxysilylene group, a diisopropoxysilylene group, a 1,2-ethanedioxysilylene group, and a 1,3-propanedioxysilylene group. A silylene group, a monomethylsilylene group, a dimethysilylene group, a diphenylsilylene group, and a monomethylsilylene group are preferable in view of easy synthesis of a catalyst.

In formula (C1), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O. R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. In this case, the bonding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M.

When Q is —P(—R$^8$)(—R$^9$)=O, R$^8$ and R$^9$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group.

The alkoxy group represented by R$^8$ or R$^9$ preferably has 1 to 20 carbon atoms, and examples thereof include a methoxy group, an ethoxy group, a 1-propoxy group, an isopropoxy group, a 1-butoxy group, an isobutoxy group, a sec-butoxy group, and a t-butoxy group. The aryloxy group represented by R$^8$ or R$^9$ preferably has 6 to 24 carbon atoms, and examples thereof include a phenoxy group. Examples of amino groups represented by R$^8$ or R$^9$ include an amino group, a monomethylamino group, a dimethylamino group, a monoethylamino group, and a diethylamino group.

Examples of hydrocarbon groups having 1 to 30 carbon atoms represented by R$^8$ or R$^9$, which may be substituted with one or more groups selected from a halogen atom, an alkoxy group, an aryloxy group, and an amino group, include an alkyl group (including chained alkyl groups, cycloalkyl groups, and bridged cycloalkyl groups), a phenyl group, and a naphthyl group. As a halogen atom as the substituent, a fluorine atom is preferable. The alkoxy group, aryloxy group, and amino group as the substituent are preferably the same as the alkoxy group, aryloxy group, and amino group represented by the aforementioned R$^8$ or R$^9$.

Specific examples of hydrocarbon groups having 1 to 30 carbon atoms represented by R$^8$ or R$^9$, which may be substituted with one or more groups selected from a halogen atom, an alkoxy group, an aryloxy group, and an amino group, include a methyl group, an ethyl group, an n-propyl group, an isopropyl group, an n-butyl group, an isobutyl group, a sec-butyl group, a t-butyl group, a n-pentyl group, a 2-pentyl group, a 3-pentyl group, an neopentyl group, an n-hexyl group, a 2-hexyl group, a 3-hexyl group, a 2-heptyl group, a 3-heptyl group, a 4-heptyl group, a 2-methyl-4-heptyl group, a 2,6-dimethyl-4-heptyl group, a 3-methyl-4-heptyl group, a cyclopropyl group, a cyclobutyl group, a cyclopentyl group, a cyclohexyl group, a cycloheptyl group, a cyclooctyl group, a 1-adamantyl group, a 2-adamantyl group, a menthyl group, a trifluoromethyl group, a benzyl group, a 2'-methoxybenzyl group, a 3'-methoxybenzyl group, a 4'-methoxybenzyl group, a 4'-trifluoromethylbenzyl group, a phenyl group, a 2-methylphenyl group, a 3-methylphenyl group, a 4-methylphenyl group, a 2,6-dimethylphenyl group, a 3,5-dimethylphenyl group, a 2,4,6-trimethylphenyl group, a 2-isopropylphenyl group, a 3-isopropylphenyl group, a 4-isopropylphenyl group, a 2,6-diisopropylphenyl group, a 3,5-diisopropylphenyl group, a 2,4,6-triisopropylphenyl group, a 2-t-butylphenyl group, a 2-cyclohexylphenyl group, a 2-methoxyphenyl group, a 3-methoxyphenyl group, a 4-methoxyphenyl group, a 2,6-dimethoxyphenyl group, a 3,5-dimethoxyphenyl group, a 2,4,6-trimethoxyphenyl group, a 4-fluorophenyl group, a pentafluorophenyl group, a 4-trifluoromethylphenyl group, a 3,5-bis(trifluoromethyl)phenyl group, a 1-naphthyl group, a 2-naphthyl group, a 2-furyl group, a 2-biphenyl group, a 2',6'-dimethoxy-2-biphenyl group, a 2'-methyl-2-biphenyl group, and a 2',4',6'-triisopropyl-2-biphenyl group.

From the viewpoint of catalytic activity, R$^8$ and R$^9$ are preferably a methyl group, an ethyl group, an isopropyl group, a t-butyl group, or a phenyl group, and more preferably a methyl group.

R$^8$ and R$^9$ may be the same or different. R$^6$ and R$^7$ may be bonded to form a ring structure.

R$^{10}$ where Q is —C(—R$^{10}$)=O represents a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group. Specific examples of R$^{10}$ are the same as the aforementioned specific examples of R$^8$ and R$^9$, and a methyl group, a trifluoromethyl group, or a phenyl group is preferable from the viewpoint of catalytic activity.

R$^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms.

Preferred examples of halogen atoms represented by $R^5$ are fluorine, chlorine and bromine. Among these, chlorine is preferable.

The hydrocarbon group having 1 to 30 carbon atoms represented by $R^5$ is preferably a hydrocarbon group having 1 to 13 carbon atoms, and is an alkyl group, a cycloalkyl group, an aryl group, or an aralkyl group.

Preferred examples include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group, an exo-norbonyl group, an end-norbonyl group, a 2-bicyclo[2.2.2]octyl group, a nopinyl group, a decahydronaphthyl group, a menthyl group, a neomenthyl group, a neopentyl group, a 5-decyl group, a phenyl group, a naphthyl group, an anthracenyl group, a fluorenyl group, a tolyl group, a xylyl group, a benzyl group, and a 4-ethylphenyl group.

Among these, a more preferable group is a methyl group or a benzyl group, and particularly preferably is a methyl group.

The hydrocarbon group having 1 to 30 carbon atoms substituted with a halogen atom represented by $R^5$ is preferably a group in which the aforementioned hydrocarbon group having 1 to 30 carbon atoms is substituted with fluorine, chlorine or bromine, and preferred examples include a trifluoromethyl group or a pentafluorophenyl group.

The hydrocarbon group having 2 to 30 carbon atoms substituted with an alkoxy group having 1 to 10 carbon atoms represented by $R^5$ is preferably a group in which the aforementioned hydrocarbon group having 1 to 30 carbon atoms is substituted with a methoxy group, an ethoxy group, an isopropoxy group, a 1-propoxy group, a 1-butoxy group, or a t-butoxy group. More preferred are hydrocarbon groups having 2 to 6 carbon atoms substituted with a methoxy group or an ethoxy group. Specifically, they include a 1-(methoxymethyl)ethyl group, a 1-(ethoxymethyl)ethyl group, a 1-(phenoxymethyl)ethyl group, a 1-(methoxyethyl) ethyl group, a 1-(ethoxyethyl)ethyl group, a di(methoxymethyl)methyl group, a di(ethoxymethyl)methyl group, and a di(phenoxymethyl)methyl group. Particularly preferred are a 1-(methoxymethyl)ethyl group and a 1-(ethoxymethyl) ethyl group.

The hydrocarbon group having 7 to 30 carbon atoms substituted with an aryloxy group having 6 to 20 carbon atoms represented by $R^5$ is preferably a group in which the aforementioned hydrocarbon group having 1 to 30 carbon atoms is substituted with a phenoxy group, a 4-methylphenoxy group, a 4-methoxyphenoxy group, a 2,6-dimethylphenoxy group, or a 2,6-di-t-butylphenoxy group. More preferred are hydrocarbon groups having 1 to 6 carbon atoms substituted with a phenoxy group or a 2,6-dimethylphenoxy group, and particularly preferred are a 1-(phenoxymethyl) ethyl group and a 1-(2,6-dimethylphenoxymethyl)ethyl group.

The hydrocarbon group having 3 to 30 carbon atoms substituted with an amido group having 2 to 10 carbon atoms (R—(C=O)NH—, R is an organic group) represented by $R^5$ is preferably a substituent in which the aforementioned hydrocarbon group having 1 to 30 carbon atoms is substituted with an acetamido group, a propionylamino group, a butyrylamino group, an isobutyrylamino group, a valerylamino group, an isovalerylamino group, a pivaloylamino group, or a benzoylamino group. More preferred are a 2-acetamidophenyl group, a 2-propionylaminophenyl group, a 2-valerylaminophenyl group, and a 2-benzoylaminophenyl group, and particularly preferred is a 2-acetamidophenyl group.

When $R^5$ is a hydrocarbon group substituted with an amido group, the carbonyl oxygen of the amido group can be coordinated to M to form a ring structure without using an electron-donating ligand L separately. That is, $R^5$ can serve as L. In this case, it is referred to as $R^5$ and L forming a ring. Specifically, a 2-acetamidophenyl group, a 2-propionylaminophenyl group, a 2-valerylaminophenyl group, and a 2-benzoylaminophenyl group correspond to this case. The chemical formula in the case of the 2-acetamidophenyl group is shown below.

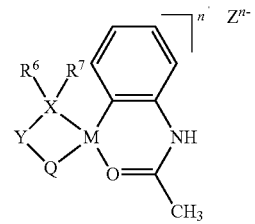

The alkoxy group having 1 to 30 carbon atoms represented by $R^5$ is preferably an alkoxy group having 1 to 6 carbon atoms, and preferred examples thereof include a methoxy group, an ethoxy group, an isopropoxy group, a 1-propoxy group, a 1-butoxy group, and a t-butoxy group. Among these, a more preferable group is a methoxy group, an ethoxy group, or an isopropoxy group, and particularly preferred is a methoxy group.

The aryloxy group having 6 to 30 carbon atoms represented by $R^5$ is preferably an aryloxy group having 6 to 12 carbon atoms, and preferable examples thereof include a phenoxy group, a 4-methylphenoxy group, a 4-methoxyphenoxy group, a 2,6-dimethylphenoxy group, and a 2,6-di-t-butylphenoxy group. Among these, a more preferable group is a phenoxy group or a 2,6-dimethylphenoxy group, and particularly preferred is a phenoxy group.

The acyloxy group having 2 to 10 carbon atoms represented by $R^5$ is preferably an acyloxy group having 2 to 8 carbon atoms, and preferred examples include an acetoxy group, a propionyloxy group, a butyryloxy group, an isobutyryloxy group, a valeryloxy group, an isovaleryloxy group, a pivaloyloxy group, and a benzoyloxy group.

Among these, a more preferable group is an acetoxy group, a propionyloxy group, or a benzoyloxy group, and particularly preferred are an acetoxy group and a propionyloxy group.

Among the preferred groups as $R^5$, more preferred are hydrocarbon groups having 1 to 20 carbon atoms, alkoxy groups having 1 to 30 carbon atoms, hydrocarbon groups having 3 to 30 carbon atoms substituted with an amido group having 2 to 10 carbon atoms, and acyloxy groups having 2 to 10 carbon atoms, and particularly preferred examples include a methyl group, a benzyl group, a methoxy group, a 2-acetamidophenyl group, and an acetyloxy group.

$R^6$ and $R^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group.

The alkoxy group represented by $R^6$ or $R^7$ preferably has 1 to 20 carbon atoms, and examples thereof include a methoxy group, an ethoxy group, a propoxy group, and an isopropoxy group.

The aryloxy group represented by $R^6$ or $R^7$ preferably has 6 to 24 carbon atoms, and examples thereof include a phenoxy group.

Examples of silyl groups represented by $R^6$ or $R^7$ include a trimethylsilyl group, a triethylsilyl group, a tri(n-propyl) silyl group, and a tri(isopropyl)silyl group. Examples of amino groups include an amino group, a monomethylamino group, a dimethylamino group, a monoethylamino group, and a diethylamino group.

Examples of hydrocarbon groups in the hydrocarbon group having 1 to 120 carbon atoms which may be substituted with one or more groups selected from a halogen atom, an alkoxy group, and an aryloxy group represented by $R^6$ or $R^7$ include an alkyl group (including chained alkyl groups, cycloalkyl groups, and bridged cycloalkyl groups), a phenyl group, and a naphthyl group, with an alkyl group having 3 to 20 carbon atoms being preferred. As a halogen atom as the substituent, a fluorine atom is preferable. The alkoxy group and the aryloxy group as the substituent are preferably the same as the alkoxy group and the aryloxy group represented by the aforementioned $R^6$ or $R^7$.

Specific examples of hydrocarbon groups having 1 to 120 carbon atoms which may be substituted with one or more groups selected from a halogen atom, an alkoxy group, and an aryloxy group, represented by $R^6$ or $R^7$ include a methyl group, an ethyl group, an n-propyl group, an isopropyl group, an n-butyl group, an isobutyl group, a sec-butyl group, a t-butyl group, an n-pentyl group, a 2-pentyl group, a 3-pentyl group, a neopentyl group, an n-hexyl group, a 2-hexyl group, a 3-hexyl group, a 2-heptyl group, a 3-heptyl group, a 4-heptyl group, a 2-methyl-4-heptyl group, a 2,6-dimethyl-4-heptyl group, a 3-methyl-4-heptyl group, a cyclopropyl group, a cyclobutyl group, a cyclopentyl group, a cyclohexyl group, a cycloheptyl group, a cyclooctyl group, a 1-adamantyl group, a 2-adamantyl group, a menthyl group (a menthyl group, a neomenthyl group, an isomenthyl group, and a neoisomenthyl group are collectively referred to as the menthyl group), a trifluoromethyl group, a benzyl group, a 2'-methoxybenzyl group, a 3'-methoxybenzyl group, a 4'-methoxybenzyl group, a 4'-trifluoromethylbenzyl group, a phenyl group, a 2-methylphenyl group, a 3-methylphenyl group, a 4-methylphenyl group, a 2,6-dimethylphenyl group, a 3,5-dimethylphenyl group, a 2,4,6-trimethylphenyl group, a 2-isopropylphenyl group, a 3-isopropylphenyl group, a 4-isopropylphenyl group, a 2,6-diisopropylphenyl group, a 3,5-diisopropylphenyl group, a 2,4,6-triisopropylphenyl group, a 2-t-butylphenyl group, a 2-cyclohexylphenyl group, a 2-methoxyphenyl group, a 3-methoxyphenyl group, a 4-methoxyphenyl group, a 2,6-dimethoxyphenyl group, a 3,5-dimethoxyphenyl group, a 2,4,6-trimethoxyphenyl group, a 4-fluorophenyl group, a pentafluorophenyl group, a 4-trifluoromethylphenyl group, a 3,5-bis(trifluoromethyl)phenyl group, a 1-naphthyl group, a 2-naphthyl group, a 2-furyl group, a 2-biphenyl group, a 2',6'-dimethoxy-2-biphenyl group, a 2'-methyl-2-biphenyl group, and a 2',4',6'-triisopropyl-2-biphenyl group. From the viewpoint of catalytic activity and the molecular weight of an obtained copolymer, $R^6$ and $R^7$ are preferably an isopropyl group, a t-butyl group, a 4-heptyl group, a 2,6-dimethyl-4-heptyl group, a cyclohexyl group, a 1-adamantyl group, a 2-adamantyl group or a menthyl group, and more preferably an isopropyl group, a t-butyl group or a menthyl group.

$R^6$ and $R^7$ may be the same or different. $R^6$ and $R^7$ may be bonded to form a ring structure.

The electron-donating ligand (L) is a compound having an electron-donating group and capable of coordinating with the metal atom M to stabilize the metal complex. As described above, when $R^5$ is a hydrocarbon group substituted with an amido group, the carbonyl oxygen of the amido group can be coordinated to M to form a ring structure. That is, $R^5$ also serves as L, and L forms a ring with $R^5$.

Examples of the electron-donating ligand (L) having a sulfur atom include dimethylsulfoxide (DMSO). Examples of the electron-donating ligand (L) having a nitrogen atom include a trialkylamine having alkyl groups having 1 to 10 carbon atoms, a dialkylamine having alkyl groups having 1 to 10 carbon atoms, pyridine, 2,6-dimethylpyridine (also known as 2,6-lutidine), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile, quinoline, and 2-methylquinoline. Examples of the electron-donating ligand (L) having an oxygen atom include diethyl ether, tetrahydrofuran, and 1,2-dimethoxyethane. Dimethylsulfoxide (DMSO), pyridine, 2,6-dimethylpyridine (also known as 2,6-lutidine), and N,N,N',N'-tetramethylethylenediamine (TMEDA) are preferable, and dimethylsulfoxide (DMSO), and 2,6-dimethylpyridine (also known as 2,6-lutidine) are more preferable, from the viewpoint of stabilization and catalytic activity of the metal complex.

q is 0, ½, 1 or 2.

In the case of isolating the metal complex of formula (C1), a metal complex stabilized by coordination of an electron-donating ligand (L) beforehand may be used. In this case, q is ½, 1 or 2. q of ½ means that one divalent electron-donating ligand is coordinated to two metal complexes. It is preferable that q be ½ or 1 in terms of stabilizing the metal complex catalyst. By q being 0, it is meant that there is no ligand.

n represents the number of charges of the organometallic compound, and is 0 or 1. $Z^{n-}$ represents a counteranion of a cationic organometallic compound, and is absent when n is 0.

$Z^-$ corresponding to the case where n is 1 represents a counteranion of a cationic organometallic complex. The counteranion represented by $Z^-$ may be any monovalent anion. Further, $Z^-$ may be a polyvalent anion as long as the number of charges per atom of the central metal (M) is a monovalent. Specific examples of T include a sulfate ion ($SO_4^{2-}$); a nitrate ion ($NO_3^-$); a carbonate ion ($CO_3^{2-}$); a perchlorate ion ($ClO_4^-$); halide ions, such as a chloride ion ($Cl^-$), a bromide ion ($Br^-$), and iodide ion ($I^-$); borate ions, such as tetrafluoroborate ($BF_4^-$), bromotrifluoroborate ($BBrF_3^-$), chlorotrifluoroborate ($BClF_3^-$), trifluoromethoxyborate ($BF_3(OCH_3)^-$), trifluoroethoxyborate ($BF_3(OC_2H_5)^-$), trifluoroallyloxyborate ($BF_3(OC_3H_5)^-$), tetraphenylborate ($B(C_6H_5)_4^-$), tetrakis(3,5-bis(trifluoromethyl)phenyl)borate ($B(3,5-(CF_3)_2C_6H_3)_4^- = BArF_4^-$), bromotriphenylborate ($BBr(C_6H_5)_3^-$), chlorotriphenylborate ($BCl(C_6H_5)_3^-$), methoxytriphenylborate ($B(OCH_3)(C_6H_5)_3^-$), ethoxytriphenylborate ($B(OC_2H_5)(C_6H_5)_3^-$), allyloxytriphenylborate ($B(OC_3H_5)(C_6H_5)_3$), tetrakis(pentafluorophenyl)borate $(B(C_6F_5)_4^-)$, bromotris(pentafluorophenyl)borate $(BBr(C_6F_5)_3^-)$, chlorotris(pentafluorophenyl) borate $(BCl(C_6F_5)_3^-)$, methoxytris(pentafluorophenyl)borate $(B(OCH_3)(C_6F_5)_3^-)$, ethoxytris(pentafluorophenyl)borate $(B(OC_2H_5)(C_6F_5)_3^-)$, and allyloxytris(pentafluorophenyl)borate $(B(OC_3H_5)(C_6F_5)_3^{-1})$; sulfonate ions, such as methanesulfonate $(CH_3SO_3^-)$, trifluoromethanesulfonate $(CF_3SO_3^-)$, nonafluorobutanesulfonate $(C_4F_9SO_3^-)$, benzenesulfonate $(C_6H_5SO_3^-)$, and p-toluenesulfonate $(p-CH_3-C_6H_4SO_3)$; carboxylate ions, such as an acetate ion $(CH_3CO_2)$, a trifluoroacetate ion $(CF_3CO_2^-)$, a trichloroacetate ion $(CCl_3CO_2^-)$, a propionate ion $(C_2H_5CO_2^-)$, and a benzoate ion $(C_6H_5CO_2^-)$; phosphate ions, such as hexafluorophosphate $(PF_6^-)$; arsenate ions, such as a hexafluoroarsenate ion $(AsF_6^-)$; antimonate ions, such as hexafluoroantimonate $(SbF_6^-)$; and silicate anions, such as hexafluorosilicate $(SiF_6^-)$. Among these counter ions, $Z^-$ is preferably $SbF_6^-$, $BPh_4^-$, $BArF_4^-$, $BF_4^-$ or $PF_6^-$, from the viewpoint of availability of a raw material and catalytic activity.

The value of n and the presence or absence of $Z^{n-}$ are determined by the type of Q. When Q is an anionic ligand selected from $-S(=O)_2-O-$, $-C(=O)-O-$, $-P(=O)(-OH)-O-$, $-O-$, and $-S-$, n is 0 and the metal complex represented by formula (C1) is a neutral organometallic compound, so there is no e which is a counteranion. That is, in this case, the metal complex represented by formula (C1) is represented by formula (C2)

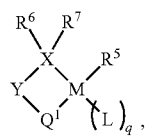

(C2)

wherein X, Y, M, L, q, $R^5$, $R^6$, and $R^7$ represent the same meanings as described in formula (C1), and $Q^1$ represents an anionic ligand selected from $-S(=O)_2-O-$, $-C(=O)-O-$, $-P(=O)(-OH)-O-$, $-O-$, and $-S-$.

$Q^1$ represents an anionic ligand selected from $-S(=O)_2-O-$, $-C(=O)-O-$, $-P(=O)(-OH)-O-$, $-O-$, and $-S-$. In this case, the bonding mode is $Y-S(=O)_2-O-M$, $Y-C(=O)-O-M$, $Y-P(=O)(-OH)-O-M$, $Y-O-M$, or $Y-S-M$, with one electron coordinated to the metal atom M. From the viewpoint of catalytic activity, $Q^1$ is particularly preferably $-S(=O)_2-O-$. In this case, the catalyst structure is represented by formula (C4).

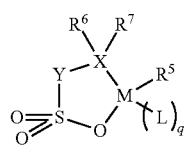

(C4)

On the other hand, when Q is a neutral ligand selected from $-P(-R^8)(-R^9)=O$ and $-C(-R^{10})=O$, n is 1 and the counteranion is Z. That is, in this case, the metal complex represented by formula (C1) is represented by formula (C3)

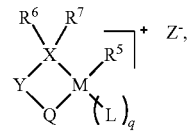

(C3)

wherein X, Y, M, L, q, $R^5$, $R^6$, $R^7$, and Z represent the same meanings as described in formula (C1), and $Q^2$ represents a neutral ligand selected from $-P(-R^8)(-R^9)=O$ and $-C(-R^{10})=O$, wherein $R^8$, $R^9$ and $R^{10}$ represent the same meanings as described in formula (C1).

$Q^2$ represents a neutral ligand selected from $-P(-R^8)(-R^9)=O$ and $-C(-R^{10})=O$. In this case, the bonding mode is $Y-P(-R^8)(-R^9)=O-M$ or $Y-C(-R^{10})=O-M$, with two electrons coordinated to the metal atom M. $Q^2$ being $-C(-R^{10})=O$ provides the structure of formula (C5). The symbols in the formula represent the same meanings as described in formula (C1).

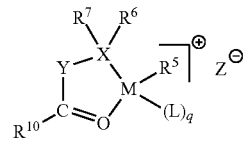

(C5)

[Method for Producing Metal Complex]

A metal complex which is a catalyst represented by formula (C1) can be synthesized according to a method described in the known literature (e.g., J. Am. Chem. Soc. 2012, 134, 8802). That is, a zero- or di-valent M source is reacted with a ligand in formula (C1). When the metal complex represented by formula (C1) is one represented by formula (C3), a monovalent metal salt is reacted to synthesize the metal complex, in order to further introduce a counteranion T, after reacting the M source with the ligand.

Examples of zero-valent M sources include tris(dibenzylideneacetone)dipalladium as a palladium source, and tetracarbonylnickel(0): $Ni(CO)_4$, and bis(1,5-cyclooctadiene)nickel as a nickel source.

Examples of divalent M sources include (1,5-cyclooctadiene)(methyl)palladium chloride, palladium chloride, palladium acetate, bis(acetonitrile)dichloropalladium: $PdCl_2(CH_3CN)_2$, bis(benzonitrile)dichloropalladium: $PdCl_2(PhCN)_2$, (N,N,N',N'-tetramethylethylenediamine)dichloropalladium(II): $PdCl_2$ (TMEDA), (N,N,N',N'-tetramethylethylenediamine)dimethylpalladium(II): $PdMe_2$ (TMEDA), bis(acetylacetonato)palladium(II): $Pd(acac)_2$ (acac=acetylacetonato), and palladium(II) trifluoromethanesulfonate: $Pd(OSO_2CF_3)_2$ as a palladium source, and (allyl)nickel chloride, (allyl)nickel bromide, nickel chloride, nickel acetate, bis(acetylacetonato)nickel(II): $Ni(acac)_2$, (1,2-dimethoxyethane)dichloronickel(II): $NiCl_2$ (DME), and nickel(II) trifluoromethanesulfonate: $Ni(OSO_2CF_3)_2$ as a nickel source.

The metal complex represented by formula (C1) can be isolated and used. A metal source containing M and a ligand precursor can be contacted in a reaction system and directly (in situ) subjected to polymerization without isolating the complex. In particular, when $R^5$ in formula (C1) is a hydrogen atom, it is preferable that a metal source containing a zero-valent M and a ligand be reacted, and then subjected to polymerization without isolating the complex.

The ratio of the M source (M) to the ligand (C1 ligand) in formula (C1) ((C1 ligand)/M) is preferably selected from the range of 0.5 to 2.0, and more preferably the range of 1.0 to 1.5.

The metal complex represented by formula (C1) can also be supported on a carrier and used for polymerization. The carrier in this case is not particularly limited, and examples thereof include an inorganic carrier, such as silica gel and alumina, and an organic carrier, such as polystyrene, polyethylene, and polypropylene. Examples of a method for supporting the metal complex include a physical adsorption method in which a solution of the metal complex is impregnated in a carrier and dried, and a method in which the metal complex is chemically coupled to the carrier and supported thereon.

[Monomer]

In the method for producing a copolymer according to the present invention, an allyl monomer having a polar group to be copolymerized with ethylene is represented by formula (2).

$$CH_2=CH-CH_2-R^1 \qquad (2)$$

In the formula, $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom.

$R^1$ being an alkoxy group having 1 to 10 carbon atoms is preferably an alkoxy group having 1 to 4 carbon atoms, and preferred examples thereof include a methoxy group, an ethoxy group, an isopropoxy group, a 1-propoxy group, a 1-butoxy group, and a t-butoxy group.

Among these, a more preferable substituent is a methoxy group, an ethoxy group, or an isopropoxy group, and particularly preferred is a methoxy group.

$R^1$ being an aryloxy group having 6 to 20 carbon atoms is preferably an aryloxy group having 6 to 12 carbon atoms, and preferred examples thereof include a phenoxy group, a 4-methylphenoxy group, a 4-methoxyphenoxy group, a 2,6-dimethylphenoxy group, a 3,5-di-t-butylphenoxy group, and a 2,6-di-t-butylphenoxy group.

Among these, a more preferable substituent is a phenoxy group, a 3,5-di-t-butylphenoxy group, or a 2,6-dimethylphenoxy group, and particularly preferred are a phenoxy group and a 3,5-di-t-butylphenoxy group.

$R^1$ being an acyl group having 2 to 10 carbon atoms is preferably an acyl group having 2 to 8 carbon atoms, and preferred examples thereof include an acetyl group, a propionyl group, a butyryl group, an isobutyryl group, a valeryl group, an isovaleryl group, a pivaloyl group, and a benzoyl group.

Among these, a more preferable substituent is an acetyl group, a pivaloyl group, or a benzoyl group, and particularly preferred is a benzoyl group.

$R^1$ being an ester group having 2 to 10 carbon atoms (oxycarbonyl group; R—O—(C=O)—, R is an organic group) is preferably an ester group having 2 to 8 carbon atoms, and preferred examples thereof include a methoxycarbonyl group, an ethoxycarbonyl group, an n-propoxycarbonyl group, an isopropoxycarbonyl group, an n-butoxycarbonyl group, a t-butoxycarbonyl group, a (4-hydroxybutoxy)carbonyl group, a (4-glycidylbutoxy)carbonyl group, and a phenoxycarbonyl group.

Among these, examples of more preferable substituents include a methoxycarbonyl group, an ethoxycarbonyl group, and a (4-hydroxybutoxy)carbonyl group, and particularly preferred is a methoxycarbonyl group.

$R^1$ being an acyloxy group having 2 to 10 carbon atoms is preferably an acyloxy group having 2 to 8 carbon atoms, and preferred examples thereof include an acetoxy group, a propionyloxy group, a butyryloxy group, an isobutyryloxy group, a valeryloxy group, an isovaleryloxy group, a pivaloyloxy group, and a benzoyloxy group.

Among these, a more preferable substituent is an acetoxy group, a propionyloxy group, or a benzoyloxy group, and particularly preferred are an acetoxy group and a propionyloxy group.

Preferred examples of $R^1$ being a substituted amino group having 1 to 12 carbon atoms include a monomethylamino group, a dimethylamino group, a monoethylamino group, a diethylamino group, a monoisopropylamino group, a diisopropylamino group, a monophenylamino group, a diphenylamino group, a bis(trimethylsilyl)amino group, and a morpholinyl group.

Among these, a more preferable substituent is a dimethylamino group or a diphenylamino group.

Preferred examples of $R^1$ being a substituted amido group having 1 to 12 carbon atoms (R—(C=O)NH—, R is an organic group) include an acetamido group, a propionylamino group, a butyrylamino group, an isobutyrylamino group, a valerylamino group, an isovalerylamino group, a pivaloylamino group, and a benzoylamino group.

Among these, a more preferable substituent is an acetamido group, a propionylamino group, or a benzoylamino group, and particularly preferred is an acetamido group.

Preferred examples of $R^1$ being a substituted pyridyl group having 5 to 10 carbon atoms include a 2-pyridyl group, a 3-pyridyl group, a 2-(3-methyl)pyridyl group, a 2-(4-methyl)pyridyl group, a 3-(2-methyl)pyridyl group, a 3-(4-methyl)pyridyl group, a 2-(4-chloromethyl)pyridyl group, and a 3-(4-chloromethyl)pyridyl group.

Among these, examples of more preferable substituents include a 2-pyridyl group, a 3-pyridyl group, and a 2-(4-methyl)pyridyl group, and particularly preferred is a 2-pyridyl group.

Preferred examples of $R^1$ being a substituted pyrrolidyl group having 4 to 10 carbon atoms include a 2-pyrrolidyl group, a 3-pyrrolidyl group, a 2-(1-methyl)pyrrolidyl group, a 2-(1-butyl)pyrrolidyl group, a 2-(1-cyclopentenyl)pyrrolidyl group, a 2-(4-methoxycarbonyl)pyrrolidyl group, a 2-(5-methoxycarbonyl)pyrrolidyl group, and a 2-(6-methoxycarbonyl)pyrrolidyl group.

Among these, examples of more preferable substituents include a 2-pyrrolidyl group, a 3-pyrrolidyl group, a 2-(1-methyl)pyrrolidyl group, and a 2-(6-methoxycarbonyl)pyrrolidyl group, and particularly preferred is a 2-pyrrolidyl group.

Preferred examples of $R^1$ being a substituted piperidyl group having 5 to 10 carbon atoms include a 2-piperidyl group, a 3-piperidyl group, a 2-(1,2,3,6-tetrahydro)piperidyl group, a 2-(1-methyl)piperidyl group, a 2-(1-ethyl)piperidyl group, a 2-(4-methyl)piperidyl group, a 2-(5-methyl)piperidyl group, and a 2-(6-methyl)piperidyl group.

Among these, examples of more preferable substituents include a 2-piperidyl group, a 3-piperidyl group, a 2-(1,2,3,6-tetrahydro)piperidyl group, a 2-(6-methyl)piperidyl group, and particularly preferred are a 2-piperidyl group and a 2-(1,2,3,6-tetrahydro)piperidyl group.

Preferred examples of $R^1$ being a substituted hydrofuryl group having 4 to 10 carbon atoms include a 2-tetrahydrofuryl group, a 3-tetrahydrofuryl group, a 2-(5-methyl)tetrahydrofuryl group, a 2-(5-isopropyl)tetrahydrofuryl group, a 2-(5-ethyl)tetrahydrofuryl group, a 2-(5-methoxy)tetrahydrofuryl group, a 2-(5-acetyl)tetrahydrofuryl group, and a 2-(4,5-benzo)tetrahydrofuryl group.

Among these, examples of more preferable substituents include a 2-tetrahydrofuryl group, a 3-tetrahydrofuryl group, a 2-(5-methyl)tetrahydrofuryl group, a 2-(5-isopropyl)tetrahydrofuryl group, and a 2-(4,5-benzo)tetrahydrofuryl group, and particularly preferred are a 2-tetrahydrofuryl group, a 2-(5-methyl)tetrahydrofuryl group, and a 2-(5-isopropyl) tetrahydrofuryl group.

Preferred examples of $R^1$ being a substituted imidazolyl group having 4 to 10 carbon atoms include a 2-imidazolyl group, a 2-(1-methyl)imidazolyl group, a 2-(1-benzyl)imidazolyl group, a 2-(1-acetyl)imidazolyl group, a 2-(4,5-benzo)imidazolyl group, and a 2-(1-methyl-4,5-benzo)imidazolyl group.

Among these, examples of more preferable substituents include a 2-imidazolyl group, a 2-(1-methyl)imidazolyl group, and a 2-(4,5-benzo)imidazolyl group, and particularly preferred are a 2-(1-methyl)imidazolyl group and a 2-(4,5-benzo)imidazolyl group.

Preferred examples of $R^1$ being an alkylthio group having 1 to 10 carbon atoms include a methylthio group, an ethylthio group, a propylthio group, and a t-butylthio group, and preferred examples of $R^1$ being an arylthio group having 6 to 10 carbon atoms include a phenylthio group.

Among these, examples of more preferable substituents include a methylthio group, a t-butylthio group, and a phenylthio group, and particularly preferred are a methylthio group and a phenylthio group.

Preferred examples of $R^1$ being a halogen atom, include fluorine, chlorine and bromine. Among these, a more preferable substituent is chlorine.

Among the preferred groups of $R^1$, an alkoxy group having 1 to 10 carbon atoms, an ester group having 2 to 10 carbon atoms, and an acyloxy group having 2 to 10 carbon atoms are more preferable. Specific examples of the allyl monomer having a particularly preferable polar group represented by formula (1) include allyl acetate, allyl trifluoroacetate, allyl benzoate, allyl alcohol, allyl methyl ether, allyl bromide, and allyl chloride.

In the method for producing a copolymer according to the present invention, the allyl monomer having a polar group represented by formula (1) to be copolymerized with ethylene may be polymerized by combining two or more kinds thereof.

In the method for producing a copolymer according to the present invention, a third monomer may be used in addition to ethylene and the allyl monomer having a polar group represented by formula (1). Examples of third monomers include α-olefins, such as propylene, 1-butene, 1-pentene, 1-hexene, 4-methyl-1-pentene, 1-heptene, 1-octene, 1-nonene, 1-decene, and styrene; cyclic olefins, such as norbornene, cyclopentene, and cyclohexene; diene compounds, such as 1,3-butadiene, 1,4-pentadiene, 1,5-hexadiene, norbornadiene, cyclopentadiene, 1,4-cyclohexadiene, and 1,4-divinylbenzene; and olefins having a polar group, such as acrylic acid esters, methacrylic acid esters, vinyl acetate, vinyl ethers, acrylonitrile, and acrolein. These may be polymerized by combining two or more kinds thereof. When an α-olefin is copolymerized as the third monomer, the ratio of α-olefin to the total of α-olefin and ethylene contained in the obtained polymer is less than 40 mol %.

The content of the third monomer contained in the copolymer is preferably less than 5 mol %.

[Polymerization Method]

A method for copolymerizing ethylene and an allyl monomer having a polar group represented by formula (1) by using a metal complex represented by formula (C1), (C2), (C3), (C4) or (C5) as a catalyst is not particularly limited, and may be a commonly used polymerization method. That is, a process method, such as a solution polymerization method, a suspension polymerization method, and a gas phase polymerization method, may be used, and a solution polymerization method and a suspension polymerization method are particularly preferable. A polymerization mode may be either a batch mode or a continuous mode. The polymerization may be carried out in a single stage polymerization or in a multistage polymerization.

Two or more kinds of the metal complex catalyst represented by formula (C1), (C2), (C3), (C4) or (C5) may be mixed and used for the polymerization reaction. By using the mixture, it is possible to control the molecular weight, the molecular weight distribution and the content of the monomer unit derived from the monomer of formula (1) of the polymer, thereby obtaining a polymer suitable for a desired use. The molar ratio of the total amount of monomer to the total amount of metal complex catalyst is in the range of 1 to 10,000,000, preferably in the range of 10 to 1,000,000, more preferably in the range of 100 to 100,000, in terms of a monomer/metal complex ratio.

The polymerization temperature is not particularly limited, but the polymerization is usually carried out in the range of −30 to 400° C., preferably in the range of 0 to 200° C., more preferably in the range of 30 to 150° C.

The polymerization pressure, in which the ethylene pressure occupies the majority of the internal pressure, is in the range of atmospheric pressure to 100 MPa, preferably in the range of atmospheric pressure to 20 MPa, more preferably in the range of atmospheric pressure to 10 MPa.

The polymerization time may be appropriately adjusted according to the process mode, the polymerization activity of the catalyst, etc., and a short reaction time of several tens of seconds to several minutes or a long reaction time of several thousands of hours is possible.

The atmosphere in the polymerization system is preferably filled with an inert gas, such as nitrogen gas or argon, so as not to mix air, oxygen, moisture, etc., other than the monomer, in order to prevent the activity of the catalyst from decreasing. In the case of solution polymerization, an inert solvent other than the monomer may be used. Examples of inert solvents include, but are not particularly limited to, aliphatic hydrocarbons, such as isobutane, pentane, hexane, heptane, and cyclohexane; aromatic hydrocarbons, such as benzene, toluene, and xylene; halogenated aliphatic hydrocarbons, such as chloroform, methylene chloride, carbon tetrachloride, dichloroethane, and tetrachloroethane; halogenated aromatic hydrocarbons, such as chlorobenzene, dichlorobenzene, and trichlorobenzene; aliphatic esters, such as methyl acetate and ethyl acetate; and aromatic esters, such as methyl benzoate and ethyl benzoate.

[Boron Compound]

In order to improve the catalytic activity, the method for producing a polymer according to the present invention is characterized in that a boron compound having one or more boron-hydrogen bonds (B—H) or boron-carbon bonds (B—C) is allowed to coexist in the polymerization reaction system.

In olefin polymerization of ethylene, etc., using metal complex (C1), (C2), (C3), (C4) or (C5) as a catalyst, a polymer is grown by repeated coordination to the metal and insertion of a monomer, and the polymer is dissociated from the catalyst by a chain transfer reaction. It is generally known that a chain transfer reaction in polymerization using a metal complex of Group 10 of the Periodic Table proceeds by a mechanism represented by the following formula (in which R' represents a polymer chain, and a ligand of metal M is omitted). In the following formula, a polymerization example using ethylene as a monomer is described, but the same also applies to other olefin monomers. In a complex species formed by inserting ethylene into an M-R' complex species, β-hydride elimination proceeds to dissociate the polymer (CH$_2$═CH—R' in the formula) from the catalyst, and at the same time, a hydride complex species (M-H in the formula) is formed and the growth reaction is halted. Since this hydride complex species is highly reactive, the coordination and insertion reaction of the monomer immediately proceeds, and then the repolymerization begins.

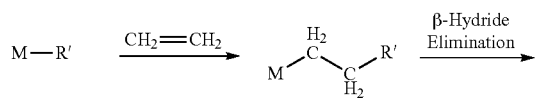

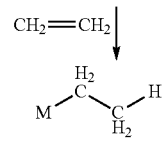

R' = Polymer

On the other hand, in polymerization of an allyl monomer having a polar group, such as allyl acetate, it has been found that the polymer growth reaction proceeds by repeating the coordination to the metal and insertion of the monomer, as with the aforementioned formula, but the mechanism of the chain transfer reaction is different. The mechanisms of the polymer growth reaction and the chain transfer reaction in the polymerization of an allyl monomer having a polar group are shown in the following formula (in which R' represents a polymer chain, Ac represents a CH$_3$C(═O)— group, and a ligand of metal M and substituents other than one hydrogen atom or one methyl group, which is a representative example of a hydrocarbon group, of a boron compound are omitted). In the following formula, a polymerization example using allyl acetate as a monomer is described, but the same also applies to other allyl monomers having a polar group represented by formula (1).

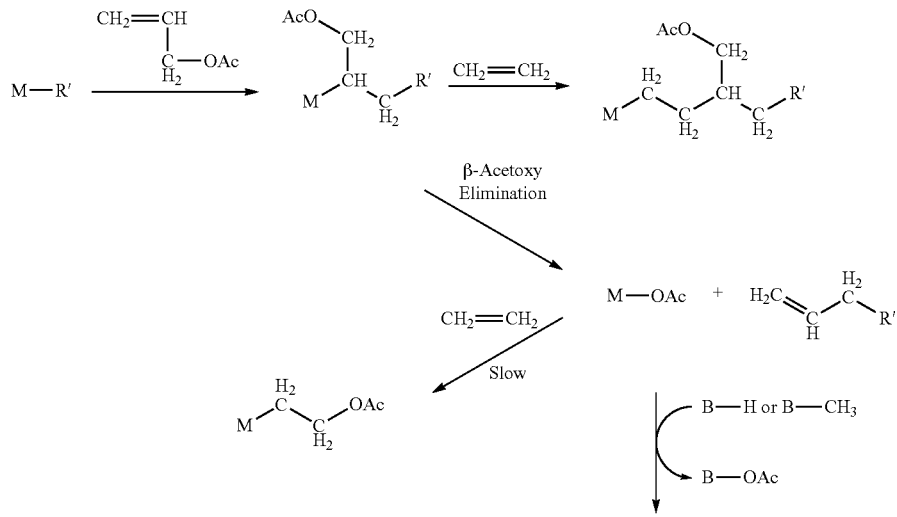

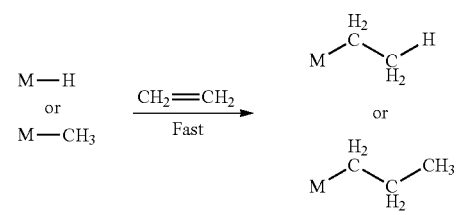

R' = Polymer
Ac = CH$_3$C(═O)—

As is the case with ethylene, when allyl acetate is incorporated into the polymer, coordination of allyl acetate to metal M and insertion reaction into M-R' bond occur. Thereafter, the polymer is grown by coordination and insertion of monomers, such as ethylene and allyl acetate, with respect to the generated complex species. On the other hand, β-acetoxy elimination proceeds at a certain rate in competition with coordination and insertion of the following monomer with respect to the complex species formed by insertion of allyl acetate with respect to the M-R' complex species. This dissociates the polymer ($CH_2$=CH—$CH_2$—R' in the formula) from the catalyst to form an acetoxy complex species (M-OAc in the formula). Since this acetoxy complex species is much less reactive than the hydride complex species, initiation of repolymerization by coordination and insertion of a monomer with respect to the acetoxy complex species is rate-limiting. In the reaction system, since the acetoxy complex species is a dormant species, the catalyst exhibiting the catalytic activity is substantially a part of the charged amount, and the polymer productivity per catalyst is low.

In the method for producing a copolymer according to the present invention, a boron compound having one or more boron-hydrogen bonds (B—H) or boron-carbon bonds (B—C) is allowed to coexist in a polymerization system, whereby an acetoxy complex species which is a dormant species is converted into a hydride complex species or alkyl complex species by reacting with the boron compound. The hydride complex species or alkyl complex species improves reactivity with the monomer, as described above, and the repolymerization by coordination and insertion reaction of the monomer is easily started. This greatly improves the polymer productivity per catalyst, leading to a reduction in catalyst cost.

In the method for producing a copolymer according to the present invention, it is essential that the boron compound to coexist in the polymerization system have one or more boron-hydrogen bonds (B—H) or boron-carbon bonds (B—C).

The boron compound to coexist in the polymerization system is not particularly limited, but is preferably selected from (A) a borane compound, (B) a boroxine compound, (C) a boronic acid compound, (D) a boronic ester compound, (E) a borinic acid compound, and (F) a borinic ester compound.

Incidentally, the borane compound, the boroxine compound, the boronic acid compound, the boronic ester compound, the borinic acid compound, and the borinic ester compound are generally represented by the following structural formulas (A) to (F), respectively, wherein R independently represents a hydrogen atom or a hydrocarbon group which may have a substituent, and when a plurality of Rs exist, they may be bonded together to form a ring structure.

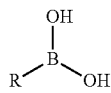

(A)

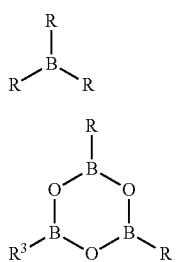

(B)

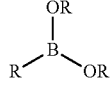

(C)

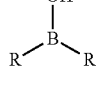

(D)

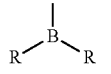

(E)

(F)

(A) Borane Compound

Preferred examples when the boron compound to coexist in the polymerization system is a borane compound include borane, monomethylborane, monoethylborane, mono(n-propyl)borane, monoisopropylborane, dimethylborane, diethylborane, di(n-propyl)borane, diisopropylborane, trimethylborane, triethylborane, tri(n-propyl)borane, triisopropylborane, monocyclohexylborane, dicyclohexylborane, tricyclohexylborane, monophenylborane, diphenylborane, triphenylborane, mono(2-tolyl)borane, di(2-tolyl)borane, tri(2-tolyl)borane, mono(3-tolyl)borane, di(3-tolyl)borane, tri(3-tolyl)borane, mono(4-tolyl)borane, di(4-tolyl)borane, tri(4-tolyl)borane, mono(2-methoxyphenyl)borane, di(2-methoxyphenyl)borane, tri(2-methoxyphenyl)borane, mono(3-methoxyphenyl)borane, di(3-methoxyphenyl)borane, tri(3-methoxyphenyl)borane, mono(4-methoxyphenyl) borane, di(4-methoxyphenyl)borane, tri(4-methoxyphenyl) borane, 9-borabicyclo[3.3.1]nonane (also known as 9-BBN), B-methyl-9-borabicyclo[3.3.1]nonane, B-ethyl-9-borabicyclo[3.3.1]nonane, B-(n-propyl)-9-borabicyclo [3.3.1]nonane, B-isopropyl-9-borabicyclo[3.3.1]nonane, and B-phenyl-9-borabicyclo[3.3.1]nonane. Among these, borane, monomethylborane, dimethylborane, trimethylborane, and 9-borabicyclo[3.3.1]nonane are preferable for reasons such as easy industrial availability and high catalytic activity improving effect.

(B) Boroxine Compound

When the boron compound to coexist is a boroxine compound, a boroxine compound represented by formula (2)

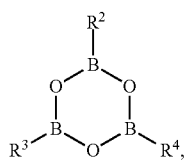

(2)

wherein $R^2$, $R^3$ and $R^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, a substituted or unsubstituted aryl group having 6 to 30 carbon atoms, and an acyloxy group having 2 to 10 carbon atoms, and at least one of $R^2$, $R^3$ and $R^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms, is preferable.

$R^2$, $R^3$ and $R^4$ each independently represent a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, a substituted or unsubstituted aryl group having 6 to 30 carbon atoms, or an acyloxy group having 2 to 10 carbon atoms. Since it is essential that the boron compound used in the present invention have one or more boron-hydrogen bonds (B—H) or boron-carbon bonds (B—C), at least one of $R^2$, $R^3$ and $R^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

Preferred examples of halogen atoms represented by $R^2$, $R^3$ or $R^4$ include fluorine, chlorine and bromine. Among these, fluorine is more preferable.

Preferred examples of alkoxy groups having 1 to 20 carbon atoms represented by $R^2$, $R^3$ or $R^4$ include a methoxy group, an ethoxy group, a 1-propoxy group, an isopropoxy group, a 1-butoxy group, a sec-butoxy group and a t-butoxy group. Among these, a methoxy group, an ethoxy group, a 1-propoxy group, and an isopropoxy group are more preferable.

Preferred examples of aryloxy groups having 6 to 20 carbon atoms represented by $R^2$, $R^3$ or $R^4$ include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, and a 3,6-dimethylphenoxy group. Among these, a phenoxy group is more preferable.

Preferred examples of substituted amino groups having 1 to 20 carbon atoms represented by $R^2$, $R^3$ or $R^4$ include a monomethylamino group, a dimethylamino group, a monoethylamino group, a diethylamino group, a mono(1-propyl)amino group, a di(1-propyl)amino group, a monoisopropylamino group, a diisopropylamino group, a mono(1-butyl)amino group, a di(1-butyl)amino group, a monophenylamino group, and a diphenylamino group. Among these, a monomethylamino group, a dimethylamino group, a monoethylamino group, and a diethylamino group are more preferable.

Preferred examples of substituted or unsubstituted alkyl groups having carbon atoms 1 to 30 represented by $R^2$, $R^3$ or $R^4$ include a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, a 1,1-dimethyl-2-phenylethyl group, an isopropyl group, a 1-dimethylpropyl group, a 1,1,2-trimethylpropyl group, a 1,1-diethylpropyl group, a 1-phenyl-2-propyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a neopentyl group, a 5-decyl group, a trifluoromethyl group, a pentafluoroethyl group, a heptafluoropropyl group, and a nonafluorobutyl group. Among these, a methyl group, an ethyl group, a 1-propyl group, an isopropyl group, and a t-butyl group are more preferable.

Preferred examples of substituted or unsubstituted cycloalkyl groups having 3 to 30 carbon atoms represented by $R^2$, $R^3$ or $R^4$ include a cyclopropyl group, a cyclobutyl group, a cyclopentyl group, a cyclohexyl group, a cycloheptyl group, and a cyclooctyl group. Among these, a cyclopentyl group and a cyclohexyl group are more preferable.

Preferred examples of substituted or unsubstituted aryl groups having 6 to 30 carbon atoms represented by $R^2$, $R^3$ or $R^4$ include a phenyl group, a naphthyl group, an anthracenyl group, a fluorenyl group, a 2-tolyl group, a 3-tolyl group, a 4-tolyl group, a xylyl group, a 2-ethylphenyl group, a 3-ethylphenyl group, a 4-ethylphenyl group, a 2-methoxyphenyl group, a 3-methoxyphenyl group, and a 4-methoxyphenyl group. Among these, a phenyl group, a 2-tolyl group, a 3-tolyl group, a 4-tolyl group, a 2-methoxyphenyl group, a 3-methoxyphenyl group, and a 4-methoxyphenyl group are more preferable.

Preferred examples of acyloxy groups having 2 to 10 carbon atoms represented by $R^2$, $R^3$ or $R^4$ include an acetoxy group, a propionyloxy group, a butyryloxy group, an isobutyryloxy group, a valeryloxy group, an isovaleryloxy group, a pivaloyloxy group, and a benzoyloxy group. Among these, an acetoxy group, a propionyloxy group, and a benzoyloxy group are more preferable.

$R^2$, $R^3$ and $R^4$ may be the same or different, but at least one of $R^2$, $R^3$ and $R^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

It is preferable that $R^2$, $R^3$ and $R^4$ be unsubstituted alkyl groups having 1 to 30 carbon atoms, or substituted or unsubstituted aryl groups having 6 to 30 carbon atoms, in view of industrial availability and reactivity with a dormant species which is formed during the polymerization reaction, such as an acetoxy complex. Furthermore, trialkylboroxines or triarylboroxines in which $R^2$, $R^3$ and $R^4$ are all the same are more preferred. As the unsubstituted alkyl group, a methyl group, an ethyl group, a 1-propyl group, and an isopropyl group are preferable, and as the unsubstituted aryl group, a phenyl group is preferable.

As the boroxine compound represented by formula (2), trimethylboroxine, triethylboroxine, tri(1-propyl)boroxine, triisopropylboroxine, and triphenylboroxine are particularly preferable. Two or more kinds of boron compounds may be mixed and used.

(C) Boronic Acid Compound

Preferred examples when the boron compound to coexist in the polymerization system is a boronic acid compound include methylboronic acid, ethylboronic acid, n-propylboronic acid, isopropylboronic acid, cyclohexylboronic acid, phenylboronic acid, 2-tolylbolonic acid, 3-tolylbolonic acid, 4-tolylbolonic acid, 2-methoxyphenylboronic acid, 3-methoxyphenylboronic acid, 4-methoxyphenylboronic acid, 2-thiopheneboronic acid, 3-thiopheneboronic acid, 2-pyridineboronic acid, 3-pyridineboronic acid, and 4-pyridineboronic acid. Among these, methylboronic acid, ethylboronic acid, and phenylboronic acid are preferable for reasons such as easy industrial availability and high catalytic activity improving effect.

(D) Boronic Ester Compound

Preferred examples when the boron compound to coexist in the polymerization system is a boronic ester compound include 4,4,5,5-tetramethyl-1,3,2-dioxaborolane (also known as pinacolborane), 2-methyl-4,4,5,5-tetramethyl-1,3,2-dioxaborolane, 2-ethyl-4,4,5,5-tetramethyl-1,3,2-dioxaborolane, 2-(n-propyl)-4,4,5,5-tetramethyl-1,3,2-dioxaborolane, 2-isopropyl-4,4,5,5-tetramethyl-1,3,2-dioxaborolane, 2-phenyl-4,4,5,5-tetramethyl-1,3,2-dioxaborolane, 2-(2-tolyl)-4,4,5,5-tetramethyl-1,3,2-dioxaborolane, 2-(3-tolyl)-4,4,5,5-tetramethyl-1,3,2-dioxaborolane, 2-(4-tolyl)-4,4,5,5-tetramethyl-1,3,2-dioxaborolane, 2-(2-methoxyphenyl)-4,4,5,5-tetramethyl-1,3,2-dioxaborolane, 2-(3-methoxyphenyl)-4,4,5,5-tetramethyl-1,3,2-dioxaborolane, 2-(4-methoxyphenyl)-4,4,5,5-tetramethyl-1,3,2-dioxaborolane, catecholborane, B-methylcatecholborane, B-ethylcatecholborane, B-(n-propyl)catecholborane, B-isopropylcatecholborane, B-phenylcatecholborane, B-(2-tolyl)catecholborane, B-(3-tolyl)catecholborane, B-(4-tolyl)catecholborane, B-(2-methoxyphenyl)catecholborane, B-(3-methoxyphenyl)catecholborane, and B-(4-methoxyphenyl)catecholborane. Among these, 4,4,5,5-tetramethyl-1,3,2-dioxaborolane, 2-methyl-4,4,5,5-tetramethyl-1,3,2-dioxaborolane, catecholborane, and B-methylcatecholborane are preferable for reasons such as easy industrial availability and high catalytic activity improving effect.

(E) Borinic Acid Compound

Preferred examples when the boron compound to coexist in the polymerization system is a borinic acid compound include dimethylborinic acid, diethylborinic acid, di(n-propyl)borinic acid, diisopropylborinic acid, dicyclohexylborinic acid, diphenylborinic acid, di(2-tolyl)borinic acid, di(3-tolyl)borinic acid, di(4-tolyl)borinic acid, di(2-methoxyphenyl)borinic acid, di(3-methoxyphenyl)borinic acid, and di(4-methoxyphenyl)borinic acid. Among these, dimethylborinic acid, diethylborinic acid, and diphenylborinic acid are preferable for reasons such as easy industrial availability and high catalytic activity improving effect.

(F) Borinic Ester Compound

Preferable examples when the boron compound to coexist in the polymerization system is a borinic ester compound include dimethyl(methoxy)borane, diethyl(methoxy)borane, di(n-propyl)(methoxy)borane, diisopropyl(methoxy)borane, dimethyl(ethoxy)borane, diethyl(ethoxy)borane, di(n-propyl)(ethoxy)borane, diisopropyl(ethoxy)borane, dimethyl(n-propoxy)borane, diethyl(n-propoxy)borane, di(n-propyl)(n-propoxy)borane, diisopropyl(n-propoxy)borane, dimethyl(isopropoxy)borane, diethyl(isopropoxy)borane, di(n-propyl)(isopropoxy)borane, diisopropyl(isopropoxy)borane, diphenyl(methoxy)borane, diphenyl(ethoxy)borane, diphenyl(n-propoxy)borane, and diphenyl(isopropoxy)borane. Among these, dimethyl(methoxy)borane, diethyl(methoxy)borane, dimethyl(ethoxy)borane, diethyl(ethoxy)borane, diphenyl(methoxy)borane, and diphenyl(ethoxy)borane are preferable for reasons such as easy industrial availability and high catalytic activity improving effect.

The aforementioned boron compound having one or more boron-hydrogen bonds or boron-carbon bonds may be used alone, or two or more kinds thereof may be used in combination.

In the method for producing a copolymer according to the present invention, a method for adding the boron compound having one or more boron-hydrogen bonds or boron-carbon bonds is not particularly limited, and the boron compound may be dissolved in a reaction solvent before the reaction or may be added after the reaction is started. Examples of the method for adding the boron compound include a method in which the addition is completed at the start of the reaction, an intermittent feed method in which the addition is carried out over a predetermined reaction period after the start of the reaction, and a continuous feed method in which the addition is carried out continuously. From the viewpoint of catalytic activity and productivity, it is preferable that the boron compound be divided and added in small batches, or continuously added, during the reaction period, rather than the addition at one time.

The amount of the boron compound used is not particularly limited, and the optimum amount is determined by the reactivity of the boron compound with the catalyst used. The molar ratio of the total amount of boron compound added to the amount of metal complex catalyst is preferably in the range of 1 to 1000, more preferably in the range of 3 to 500, further preferably in the range of 5 to 200, in terms of a boron compound/metal complex ratio. Specifically, when the entirety of the boron compound is added to the reaction system at an early stage of polymerization, the molar ratio of the total amount of boron compound added to the amount of metal complex catalyst is preferably in the range of 10 to 1000, more preferably in the range of 30 to 500, further preferably in the range of 50 to 200, in terms of a boron compound/metal complex ratio. The aforementioned intermittent feed method or continuous feed method preferably uses a range of 1 to 50, more preferably a range of 3 to 30, further preferably a range of 5 to 10.

When the boron compound is added to the polymerization reaction system, the boron compound may be added alone or with the boron compound dissolved in an organic solvent. When the boron compound is dissolved in an organic solvent and added, the solvent used in the polymerization reaction is preferable as the organic solvent. When the allyl monomer having a polar group to be copolymerized with ethylene is a liquid at normal temperature, the boron compound may be dissolved in the allyl monomer and added.

EXAMPLES

Hereinafter, the present invention will be described in more detail with reference to Synthetic Examples, Examples, Comparative Examples, and Reference Examples, but the present invention is not limited to the following examples.

The average molecular weight, monomer unit content, and melting point of the polymer were measured, analyzed, and calculated by the following methods.

[Average Molecular Weight]

The number-average molecular weight and the weight-average molecular weight of copolymers obtained in Examples and Comparative Examples were calculated by size-exclusion chromatography (solvent: 1,2-dichlorobenzene, temperature: 145° C.) using a high-temperature GPC apparatus HLC-8121GPC/HT manufactured by Tosoh Corporation equipped with AT-806MS columns (two columns in series) manufactured by Showa Denko K.K., and using polystyrene as a standard material of molecular weight.

[Monomer Unit Content]

The content of monomer units derived from olefins having a polar group represented by formula (1) was determined by $^1$H-NMR at 120° C. using 1,1,2,2-tetrachloroethane-d2 as a solvent, and using JNM-ECS400 manufactured by JEOL Ltd.

[Melting Point]

The melting point of the copolymer was measured using Differential Scanning calorimeter DSC6200 manufactured by Seiko Instruments Inc. A sheet-shaped sample piece was packed in a 5 mg aluminum pan, and once heated from room temperature to 200° C. at a rate of temperature rise of 100° C./min and held for 5 minutes, then cooled to 20° C. at 10° C./min and crystallized, and then heated to 200° C. at 10° C./min to obtain a melting curve. The peak top temperature of the main endothermic peak in the last temperature rising step carried out in order to obtain the melting curve was taken as the melting point.

Synthesis Example 1: Synthesis of Metal Complex 1

Using the method described in JP 2014-159540 A, metal complex 1 was synthesized according to the following reaction scheme.

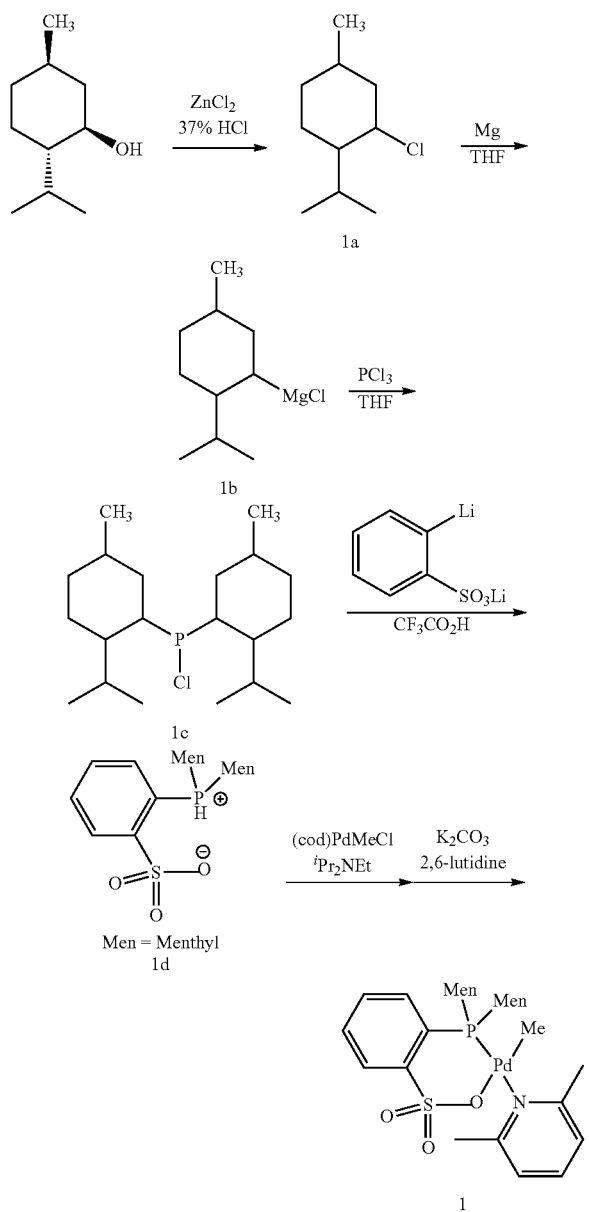

(a) Synthesis of Menthyl Chloride (Compound 1a)

Menthyl chloride (compound 1a) was synthesized according to the procedure described in the literature (J. Org. Chem., 17, 1116 (1952)). To a solution of zinc chloride (77 g, 0.56 mol) in 37% hydrochloric acid (52 mL, 0.63 mol) was added (−)-menthol (27 g, 0.17 mol) and stirred for 5 hours while being heated to 35° C. After cooling to room temperature, hexane (50 mL) was added to the reaction solution, and an organic layer and an aqueous layer were separated using a separatory funnel. The organic layer was washed with water (30 mL×1), followed by further washing with concentrated sulfuric acid (10 mL×5) and water (30 mL×5). The organic layer was dried over magnesium sulfate and concentrated under reduced pressure to obtain menthyl chloride (compound 1a) as colorless oil. Yield was 27 g (91%).

(b) Synthesis of Dimenthylphosphine Chloride (Compound 1c)

Dimenthylphosphine chloride (compound 1c) was synthesized according to the procedure described in the literature (Journal fur Praktische Chemie, 322, 485 (1980)). A solution of menthyl magnesium chloride (compound 1b) obtained by reacting menthyl chloride (compound 1a; 2.6 g, 15 mmol) and magnesium (0.63 g, 26 mmol) in tetrahydrofuran (THF) (30 mL) while being heated to 70° C. under an argon atmosphere was added to a solution of phosphorus trichloride (0.63 mL, 7.2 mmol) in THF (30 mL) at −78° C. After the temperature was raised to room temperature, the mixture was stirred for 2 hours while being heated to 70° C. After the solvent was distilled off under reduced pressure, the mixture was purified by distillation to obtain dimenthylphosphine chloride (compound 1c). Yield was 0.62 g (25%).

$^{31}$P-NMR (162 MHz, THF): δ 123.9.

(c) Synthesis of 2-(Dimenthylphosphonio)Benzenesulfonate (Compound 1d)

To a solution of benzenesulfonic acid (0.18 g, 1.2 mmol) in THF (10 mL) was added n-butyllithium (1.6 M hexane solution, 1.4 mL, 2.3 mmol) at 0° C. and stirred at room temperature for 1 hour. After the reactor was cooled to −78° C., dimenthylphosphine chloride (compound 1c; 0.36 g, 1.1 mmol) was added at −78° C. and stirred at room temperature for 15 hours. After quenching the reaction with trifluoroacetic acid (0.97 mL, 1.3 mmol), the solvent was distilled off under reduced pressure. The residue was dissolved in dichloromethane and washed with saturated aqueous ammonium chloride. After the organic layer was dried over sodium sulfate, the solvent was distilled off under reduced pressure to obtain 2-(dimenthylphosphonio)benzenesulfonate (compound 1d) as white powder. Yield was 0.31 g (63%).

$^{1}$H-NMR (500 MHz, CDCl$_{3}$): δ 8.27 (br s, 1H), 7.77 (t, J=7.3 Hz, 1H), 7.59-7.52 (m, 2H), 3.54 (br s, 1H), 2.76 (br s, 1H), 2.16 (br s, 1H), 1.86-1.38 (m, 12H), 1.22-0.84 (m, 22H), 0.27 (br s, 1H);

$^{31}$P{$^{1}$H}-NMR (162 MHz, CDCl$_{3}$): δ 45.1 (br), −4.2 (br).

(d) Synthesis of Metal Complex 1

Under an argon atmosphere, (cod)PdMeCl (synthesized according to the literature; Inorg. Chem., 1993, 32, 5769-5778, cod=1,5-cyclooctadiene, 0.079 g, 0.30 mmol) was added to a methylene chloride solution (10 mL) of 2-(dimenthylphosphonio)benzenesulfonate (compound 1d; 0.14 g, 0.30 mmol) and N,N-diisopropylethylamine (0.26 mL, 1.5 mmol) and stirred at room temperature for 1 hour. After concentrating the solution, the residue was dissolved in methylene chloride (10 mL) and this solution was added to a methylene chloride suspension (2 mL) of potassium carbonate (0.42 g, 3.0 mmol) and 2,6-lutidine (0.35 mL, 3.0 mmol) and stirred at room temperature for 1 hour. After filtration of the reaction solution with Celite (dried diatomaceous earth) and Florisil (magnesium silicate), the solvent was concentrated and subjected to drying under reduced pressure to obtain metal complex 1. Yield was 0.17 g (80%).

$^1$H-NMR (400 MHz, CDCl$_3$): δ 8.26 (ddd, J=7.8, 3.9, 1.4 Hz, 1H), 7.81 (t, J=7.9 Hz, 1H), 7.56 (t, J=7.7 Hz, 1H), 7.49 (t, J=7.6 Hz, 1H), 7.43 (t, J=7.4 Hz, 1H), 7.13 (d, J=7.8 Hz, 1H), 7.08 (d, J=7.6 Hz, 1H), 3.75 (s, 1H), 3.24 (s, 3H), 3.17 (s, 3H), 2.59 (s, 1H), 2.49-2.39 (m, 2H), 2.29-2.27 (m, 1H), 2.05-1.96 (m, 1H), 1.89-1.37 (m, 12H), 1.21-1.11 (m, 2H), 0.98 (d, J=6.6 Hz, 3H), 0.95 (d, J=6.2 Hz, 3H), 0.84 (d, J=6.6 Hz, 3H), 0.78 (d, J=6.6 Hz, 3H), 0.58 (d, J=6.6 Hz, 3H), 0.41 (d, J=2.3 Hz, 3H), 0.08 (d, J=6.6 Hz, 3H);

$^{31}$P-NMR (162 MHz, CDCl$_3$): δ 16.6.

Synthesis Example 2: Synthesis of Metal Complex 2

Using the method described in JP 2011-68881 A, metal complex 2 was synthesized according to the following reaction scheme.

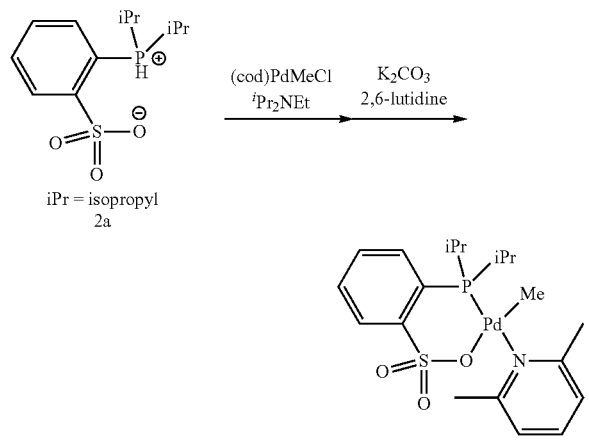

(a) Synthesis of 2-(Diisopropylphosphonio)Benzenesulfonate (Compound 2a)

To a solution of benzenesulfonic acid (21.7 g, 137 mmol) in THF (400 mL) was added n-butyllithium (1.6 M hexane solution, 174 mL, 274 mmol) at 0° C. and stirred at room temperature for 3 hours. After the reactor was cooled to −78° C., diisopropylphosphine chloride (19.0 g, 125 mmol) was added at −78° C. and stirred at room temperature for 15 hours. After quenching the reaction by adding trifluoroacetic acid (15.6 g, 137 mmol), the solvent was distilled off under reduced pressure. The residue was dissolved in dichloromethane and washed with saturated aqueous ammonium chloride. After the organic layer was dried over sodium sulfate, the solvent was distilled off under reduced pressure to obtain 2-(diisopropylphosphonio)benzenesulfonate (compound 2a) as white powder. Yield was 26.8 g (78%).

$^1$H-NMR (400 MHz, CDCl$_3$): δ 1.25 (dd, J=21.6, 7.0 Hz, 6H), 1.53 (dd, J=21.8, 7.2 Hz, 6H), 3.45 (m, 2H), 5.42 (br d, $^1J_{PH}$=380 Hz), 7.58 (tdd, J=7.6, 2.8, 1.1 Hz, 1H), 7.69 (ddd, J=15.1, 7.7, 0.7 Hz, 1H), 7.83 (dd, J=7.6, 7.6 Hz, 1H), 8.27 (dd, J=7.5, 4.4 Hz, 1H);

$^{13}$C-NMR (101 MHz, CDCl$_3$): δ 19.4 (s), 24.5-27.7 (m), 114.4 (br d, J=93 Hz), 129.1 (d, J=8.6 Hz), 130.3 (d, J=12.5 Hz), 134.7-137.1 (m), 150.7 (br s);

$^{31}$P-NMR (162 MHz, CDCl$_3$): δ 62.5 (d, $^1J_{PH}$=380 Hz) (83%), 31.0 (d, $^1J_{PH}$=460 Hz) (17%).

(b) Synthesis of Metal Complex 2

Under an argon atmosphere, (cod)PdMeCl (synthesized according to the literature; Inorg. Chem., 1993, 32, 5769-5778, cod=1,5-cyclooctadiene, 16.3 g, 62 mmol) was added to a methylene chloride solution (500 mL) of 2-(diisopropylphosphonio)benzenesulfonate (compound 2a; 16.3 g, 59 mmol) and N,N-diisopropylethylamine (38.3 g, 296 mmol) and stirred at room temperature for 2.5 hours. After concentrating the solution, the residue was dissolved in methylene chloride (200 mL) and this solution was added to a methylene chloride suspension (500 mL) of potassium carbonate (80.8 g, 585 mmol) and 2,6-lutidine (62.7 g, 585 mmol) and stirred at room temperature for 1 hour. After filtration of the reaction solution with Celite (dried diatomaceous earth) and Florisil (magnesium silicate), the solvent was concentrated and subjected to drying under reduced pressure. Further, recrystallization purification from methylene chloride/hexane was carried out to obtain metal complex 2 as white crystal. Yield was 18.9 g (61%).

$^1$H-NMR (400 MHz, CDCl$_3$): δ 0.34 (d, J=2.3 Hz, 3H), 1.32 (ddd, J=49.9, 16.0, 7.0 Hz, 12H), 2.58 (dt, J=22.3, 7.2 Hz, 2H), 3.18 (s, 6H), 7.12 (d, J=7.8 Hz, 2H), 7.46 (t, J=7.4 Hz, 1H), 7.53 (t, J=7.6 Hz, 1H), 7.58 (t, J=7.7 Hz, 2H), 8.29-8.32 (m, 1H);

$^{13}$C-NMR (101 MHz, CDCl$_3$): δ −10.10 (d, J=4.8 Hz), 18.44 (s), 19.29 (d, J=4.8 Hz), 25.91 (d, J=25.9 Hz), 26.20 (s), 122.72 (d, J=3.8 Hz), 124.56 (d, J=35.5 Hz), 129.19 (t, J=6.7 Hz), 131.03 (d, J=1.9 Hz), 132.39 (s), 138.30 (s), 151.13 (d, J=10.5 Hz), 159.17 (s);

$^{31}$P-NMR (162 MHz, CDCl$_3$): δ 34.4 (s).

[Synthesis of Polymers]

Copolymerization of allyl acetate and ethylene was carried out using metal complex 1 synthesized in Synthesis Example 1.

The catalyst concentration, productivity, and catalytic activity were calculated by the following formulae.

Productivity (g/mmol) =

$$\frac{\text{Yield of obtained polymer (g)}}{\text{Molar number of metal complex catalyst used (mmol)}}$$

Catalytic activity (g/mmol·h) =

$$\frac{\text{Yield of obtained polymer (g)}}{\text{Molar number of metal complex catalyst used (mmol)} \times \text{reaction time (h)}}$$

Example 1: Copolymerization of Allyl Acetate and Ethylene in the Coexistence of Trimethylboroxine Using Metal Complex 1 (Preparation of Polymer 1)

Under a nitrogen gas atmosphere, a 500 mL autoclave containing allyl acetate (120 mL, 1,390 mmol) as a monomer represented by formula (1) and trimethylboroxine (251.1 mg, 2.0 mmol) as a boron compound having one or more boron-hydrogen bonds or boron-carbon bonds was charged with ethylene (0.51 MPa) while stirring at 65° C. An allyl acetate solution (30 mL) of metal complex 1 (13.9 mg, 0.020 mmol) was added to the autoclave by pressure feeding and stirred for 24 hours. After cooling to room temperature and ethylene depressurization, the reaction solution in the autoclave was added to methanol (500 mL) to precipitate a copolymer. The resulting copolymer was collected by filtration, washed with methanol, and dried under reduced pressure to obtain polymer 1. The yield was 1.02 g. The productivity was calculated to be 51 g/mmol and the catalytic activity was calculated to be 2.1 g/(mmol·h). The molecular weight of polymer 1 was measured by size-exclusion chromatography, and the number-average molecular weight was 19,000, the weight-average molecular weight was 65,000, and Mw/Mn was 3.5. The allyl acetate content in the copolymer was determined to be 100:27.2 (allyl acetate molar fraction=21.4%) for ethylene:allyl acetate by $^1$H-NMR measurement. The polymerization conditions and results are shown in Tables 1 and 2, respectively.

Comparative Example 1: Copolymerization of Allyl Acetate and Ethylene Using Metal Complex 1 (Preparation of Comparative Polymer 1)

Copolymerization of allyl acetate and ethylene was carried out in the same manner as in Example 1 except that trimethylboroxine was not added. The polymerization conditions and results are shown in Tables 1 and 2, respectively.

Example 2: Copolymerization of Allyl Acetate and Ethylene in the Coexistence of Trimethylboroxine Using Metal Complex 1 (Preparation of Polymer 2)

Copolymerization of allyl acetate and ethylene was carried out in the same manner as in Example 1 except that the equivalent of trimethylboroxine and the timing of addition were changed. The polymerization conditions and results are shown in Tables 1 and 2, respectively.

Example 3: Copolymerization of Allyl Acetate and Ethylene in the Coexistence of Trimethylboroxine Using Metal Complex 1 (Preparation of Polymer 3)

Copolymerization of allyl acetate and ethylene was carried out in the same manner as in Example 1 except that the equivalent of trimethylboroxine was changed and the addition was divided into four times. The polymerization conditions and results are shown in Tables 1 and 2, respectively.

TABLE 1

| | | | | | Monomer of formula (1) | | Boron compound formula (2): trimethylboroxine | | | | | | |
| | Catalyst | | | Ethylene | allyl acetate | Total added amount | | Added amount per addition | | Reaction time at the time of addition | Boron compound/ catalyst | Reaction Temp. | Reaction Time |
| Examples | Type | mg | mmol | MPa | mL | mg | mmol | mg | mmol | hours | molar ratio | °C. | h |
| Ex. 1 | Metal complex 1 | 13.9 | 0.020 | 0.51 | 150 | 251.1 | 2.00 | 251.1 | 2.00 | Initial charge | 100.0 | 65 | 24 |
| Comp. Ex. 1 | Metal complex 1 | 13.9 | 0.020 | 0.51 | 150 | 0.0 | 0.00 | 0.0 | 0.00 | — | 0.0 | 65 | 24 |
| Ex. 2 | Metal complex 1 | 13.9 | 0.020 | 0.51 | 150 | 16.7 | 0.13 | 16.7 | 0.13 | 2 | 6.5 | 65 | 24 |
| Ex. 3 | Metal complex 1 | 13.9 | 0.020 | 0.51 | 150 | 16.7 | 0.13 | 4.2 | 0.033 | 2, 5, 8, 22 | 6.5 | 65 | 24 |

TABLE 2

| Examples | Polymer No. | Yield g | Productivity g/mmol | Catalytic activity g/(mmol·h) | Molecular weight | | | Allyl acetate content mol % |
| | | | | | Mn | Mw | Mw/Mn | |
| Ex. 1 | 1 | 1.02 | 51 | 2.1 | 19000 | 65000 | 3.5 | 21.4 |
| Comp. Ex. 1 | Comp. 1 | 0.41 | 21 | 0.9 | 27000 | 66000 | 2.4 | 20.3 |
| Ex. 2 | 2 | 1.05 | 53 | 2.2 | 23000 | 73000 | 3.1 | 20.0 |
| Ex. 3 | 3 | 1.36 | 68 | 2.8 | 15000 | 70000 | 4.8 | 18.4 |

From the results of Example 1 and Comparative Example 1, it was clarified that the productivity of the polymer and the catalytic activity were improved by allowing trimethylboroxine having boron-carbon bonds to coexist in the polymerization reaction system. The molecular weight and the allyl acetate content of the obtained polymer were nearly unchanged even when trimethylboroxine coexisted.

Further, from the results of Examples 2 and 3, even when trimethylboroxine was added not as an initial charge but during the reaction, an effect of improving the catalytic activity was similarly observed.

Next, in order to clarify the reaction mechanism of the copolymerization reaction between ethylene and an allyl monomer having a polar group represented by formula (1) and the mechanism of improving the catalytic activity in the coexistence of a boron compound having a boron-hydrogen bond or boron-carbon bond, the following reactions were carried out.

Reference Example 1: Reaction of Metal Complex 2 and Allyl Acetate

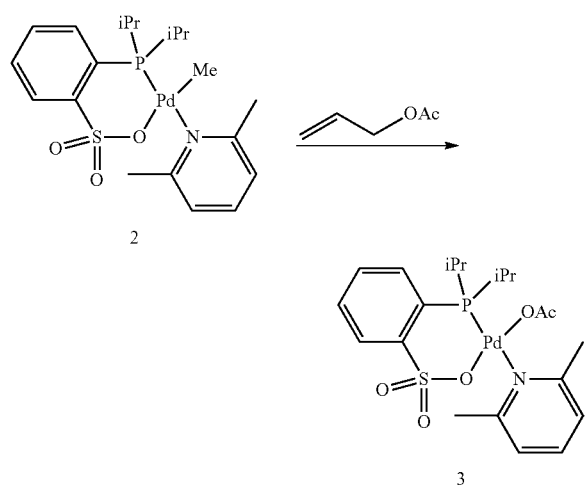

Metal complex 2 was reacted with allyl acetate in the same manner as described in WO 2012/029432 (U.S. Pat. No. 8,889,805). Under a nitrogen atmosphere, a suspension of metal complex 2 (1.2 g, 2.4 mmol) in toluene (94 mL)/allyl acetate (94 mL) was heated to 80° C. and stirred for 2 hours. After concentrating the reaction solution, methylene chloride (10 mL) was added to the residue, and the precipitate was removed by filtration using a syringe filter. Hexane (15 mL) was slowly added to the filtrate, and recrystallization was carried out. The precipitated crystals were collected by filtration, washed with t-butyl methyl ether and hexane, and dried under reduced pressure to obtain yellow crystals. Yield was 1.1 g. Analysis of $^1$H-NMR and $^{13}$C-NMR spectra identified the resulting compound as acetoxy metal complex 3 in the above formula. Yield was calculated to be 83%.

$^1$H-NMR (400 MHz, CDCl$_3$): δ 1.36-1.52 (m, 12H), 1.75 (s, 3H), 2.51-2.60 (m, 2H), 3.42 (s, 6H), 7.06 (d, 2H, J=7.2 Hz), 7.55-7.64 (m, 4H), 8.20 (br, 1H);

$^{13}$C-NMR (101 MHz, CDCl$_3$): δ 17.7 (s), 17.8 (s), 22.5 (s), 24.5 (s, CH$_3$ of lutidine), 25.0 (d, $^1$J$_{PC}$=26.5 Hz), 121.4 (d, $^1$J$_{PC}$=39.8 Hz), 122.6 (s), 128.5 (d, J$_{PC}$=5.7 Hz), 129.8 (d, J$_{PC}$=5.8 Hz), 131.6 (s), 131.8 (s), 138.5 (s), 148.5 (d, $^2$J$_{PC}$=8.3 Hz), 159.8 (s), 176.7 (s).

In Reference Example 1, acetoxy metal complex 3 was formed by the reaction between metal complex 2, which is an alkyl complex, and allyl acetate, suggesting that acetoxy metal complex 3 was also formed during the copolymerization reaction of allyl acetate and ethylene using metal complex 2.

[Comparison of Polymerization Reaction Rates of Metal Complexes 2 and 3]

In order to compare the initial reaction rates of metal complex 2 in which R$^5$ of formula (1) is a methyl group (referred to as "methyl metal complex 2") and metal complex 3 in which R$^5$ is an acetoxy group (referred to as "acetoxy metal complex 3") in the copolymerization of allyl acetate and ethylene, copolymerization of allyl acetate and ethylene was carried out in a short time using methyl metal complex 2 or acetoxy metal complex 3.

Reference Example 2: Copolymerization of Allyl Acetate and Ethylene Using Methyl Metal Complex 2

A catalyst solution was prepared by weighing 50 μmol of methyl metal complex 2 into a 30 mL flask which was sufficiently substituted with nitrogen gas, adding dehydrated toluene (10 mL), and stirring the mixture for 10 minutes. Next, the interior of a stainless-steel autoclave equipped with an inductive stirrer having an internal volume of 2.4 L was substituted with nitrogen gas, and purified toluene and allyl acetate (comonomer concentration: 0.287 mol/L) were introduced into the autoclave so as to obtain a total liquid volume of 1 L. After the polymerization temperature was raised to 80° C. and ethylene (1.4 MPa) was charged, the catalyst solution prepared above was added to carry out the polymerization for 20 minutes.

After the completion of the polymerization, ethylene was purged, the autoclave was cooled to room temperature, and the obtained polymer was reprecipitated using ethanol (1 L). The solid polymer obtained by filtration was dried under reduced pressure at 70° C. for 3 hours to collect 4.3 g of the copolymer. The productivity was calculated to be 86 g/mmol and the catalytic activity was calculated to be 258 g/(mmol·h). The molecular weight of the obtained polymer was determined by size-exclusion chromatography, and calculated to be a number-average molecular weight of 10,000 and a weight-average molecular weight of 20,000, with an Mw/Mn of 2.0. The melting point was 128.5° C.

Reference Example 3: Copolymerization of Allyl Acetate and Ethylene Using Acetoxy Metal Complex 3

Copolymerization reaction of allyl acetate and ethylene was carried out in the same manner as in Reference Example 2 except that 100 μmol of acetoxy metal complex 3 was used instead of 50 μmol of methyl metal complex 2.

The copolymer recovery was 0.8 g, the productivity was calculated to be 8 g/mmol, and the catalytic activity was calculated to be 23 g/(mmol·h). The obtained polymer had a number-average molecular weight of 9,500, and a weight-average molecular weight of 20,000, with an Mw/Mn of 2.1. The melting point was 128.3° C.

Comparison of the catalytic activities of Reference Example 2 and Reference Example 3 revealed that the (initial) polymerization activity of acetoxy metal complex 3 was less than one tenth of that of methyl metal complex 2.

This would suggest that, with respect to an acetoxy metal complex which is considered to be formed during the copolymerization reaction of allyl acetate and ethylene, repolymerization by monomer insertion is slow, and the acetoxy metal complex is a dormant species.

Reference Example 4: Reaction of Acetoxy Metal Complex 3 with Trimethylboroxine

In order to understand the reactivity between the acetoxy metal complex and the boron compound, the reaction behavior of acetoxy metal complex 3 in the presence of trimethylboroxine having boron-carbon bonds was examined.

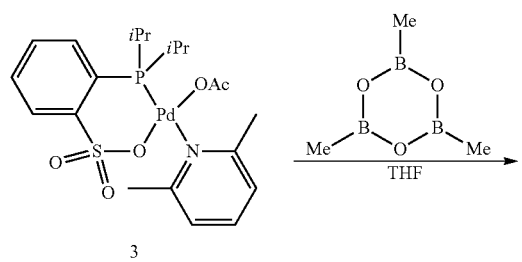

Under a nitrogen gas atmosphere, trimethylboroxine (0.85 mL, 6.10 mmol, 20 eq) was added to a solution of acetoxy metal complex 3 (0.17 g, 0.30 mmol) in tetrahydrofuran (15 mL), and stirred at 40° C. for 7 hours. The formation of methyl metal complex 2 was observed by drying the reaction solution under reduced pressure and carrying out NMR measurement (65%).

Reference Example 5: Reaction of Acetoxy Metal Complex 3 and 9-Borabicyclo[3.3.1]Nonane (9-BBN) in the Presence of Methyl Acrylate Further, in order to understand the reactivity and reaction mechanism between the boron compound having a boron-hydrogen bond and the acetoxy complex, the reaction behavior of 9-borabicyclo[3.3.1]nonane having a boron-hydrogen bond and acetoxy metal complex 3 was examined. Here, since hydride complex 4 which is expected to be generated is unstable and thus it is highly likely that a decomposition reaction proceeds, stable metal complex 5, in which methyl acrylate is incorporated by allowing methyl acrylate to coexist in the reaction system, was observed instead.

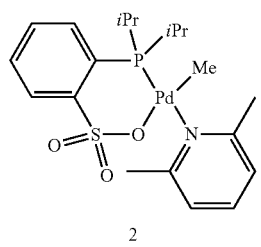

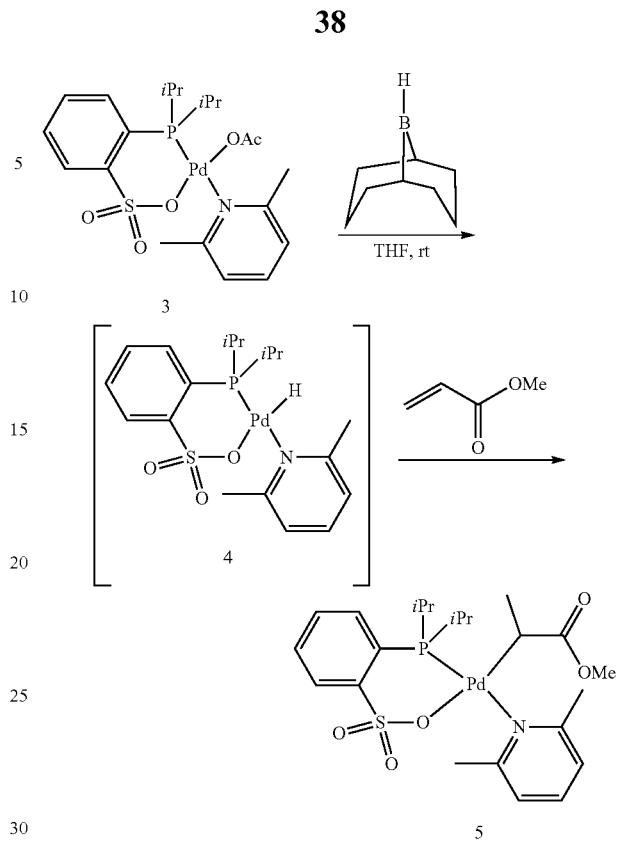

The formation of metal complex 5 in which methyl acrylate was incorporated was observed (50%) by adding methyl acrylate (0.03 g, 0.30 mmol, 10 eq) and a solution of 9-borabicyclo[3.3.1]nonane (9-BBN) in THF (0.5 mol/L) (0.53 g, 0.30 mmol, 10 eq) to a solution of acetoxy metal complex 3 (0.02 g, 0.03 mmol) in tetrahydrofuran (0.5 mL) under nitrogen atmosphere and mixed, leaving the mixture at room temperature overnight, drying the mixture under reduced pressure, and carrying out NMR measurement. As a result, it was confirmed that hydride metal complex 4 was generated by the reaction of acetoxy metal complex 3 and 9-BBN.

$^1$H-NMR (400 MHz, CDCl$_3$): δ 8.26-8.23 (m, 1H), 7.64-7.46 (m, 4H), 7.11 (dd, J=7.5 Hz, 2H), 3.41 (s, 3H), 3.28 (s, 3H), 3.4 (s, 3H), 3.04-2.98 (m, 1H), 2.68-2.62 (m, 1H), 1.48 (dd, J=7.0, 14.3 Hz, 3H), 1.40 (dd, J=7.3, 16.5 Hz, 3H), 1.36 (dd, J=7.0, 15.3 Hz, 6H), 0.93 (dd, J=3.1, 6.9 Hz, 3H);

$^{31}$P-NMR (162 MHz, CDCl$_3$): δ 28.3.

The results of Reference Example 4 and Reference Example 5 suggest that in the copolymerization of allyl acetate and ethylene, an acetoxy metal complex formed and present as a dormant species reacts with a boron compound having a boron-hydrogen bond or boron-carbon bond to be converted to a hydride complex or alkyl complex thereby accelerating the repolymerization. In other words, it is understood that, even in the case of an acetoxy metal complex, the initial polymerization activity of which is inferior to a methyl metal complex, the catalytic activity can be restored by adding a boron compound.

From the results of the above Examples, Comparative Examples, and Reference Examples, in the method for producing a copolymer of ethylene and an allyl monomer having a polar group according to the present invention, the repolymerization of the catalyst is successfully accelerated thereby improving the productivity and the catalytic activity by allowing a boron compound having a boron-hydrogen bond or boron-carbon bond to coexist in the polymerization reaction system. This makes it possible to reduce the production cost of the polymer, and thus the present invention is industrially useful.

The invention claimed is:

1. A method for producing a copolymer of ethylene and an allyl monomer having a polar group represented by formula (1)

  (1), wherein $R^1$ represents a substituent selected from the group consisting of a hydroxy group, an alkoxy group having 1 to 10 carbon atoms, an aryloxy group having 6 to 20 carbon atoms, an acyl group having 2 to 10 carbon atoms, an ester group having 2 to 10 carbon atoms, an acyloxy group having 2 to 10 carbon atoms, an amino group, a substituted amino group having 1 to 12 carbon atoms, a substituted amido group having 2 to 12 carbon atoms, a substituted pyridyl group having 5 to 10 carbon atoms, a substituted pyrrolidyl group having 4 to 10 carbon atoms, a substituted piperidyl group having 5 to 10 carbon atoms, a substituted hydrofuryl group having 4 to 10 carbon atoms, a substituted imidazolyl group having 4 to 10 carbon atoms, a mercapto group, an alkylthio group having 1 to 10 carbon atoms, an arylthio group having 6 to 10 carbon atoms, an epoxy group, and a halogen atom, or a copolymer of ethylene, the allyl monomer having a polar group represented by formula (1) and another monomer, the method comprising polymerizing ethylene and the allyl monomer having a polar group represented by formula (1), or ethylene, the allyl monomer having a polar group represented by formula (1), and another monomer, in the presence of a metal complex, wherein the metal complex is represented by formula (C1)

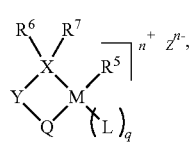  (C1)

wherein M represents an element of Group 10 of the Periodic Table, X represents a phosphorus atom (P) or an arsenic atom (As), and Y represents a divalent group selected from a substituted or unsubstituted arylene group having 6 to 30 carbon atoms, a substituted or unsubstituted alkylene group having 1 to 20 carbon atoms, a substituted or unsubstituted cycloalkylene group having 3 to 30 carbon atoms, a substituted or unsubstituted imino group (—NH—), an oxy group (—O—), and a substituted or unsubstituted silylene group (—SiH$_2$—), Q represents an anionic ligand selected from —S(=O)$_2$—O—, —C(=O)—O—, —P(=O)(—OH)—O—, —O—, and —S—, or a neutral ligand selected from —P(—R$^8$)(—R$^9$)=O, and —C(—R$^{10}$)=O, wherein R$^8$, R$^9$ and R$^{10}$ each independently represent a hydrogen atom, an alkoxy group, an aryloxy group, an amino group, or a hydrocarbon group having 1 to 30 carbon atoms which may be substituted with one or more groups selected from a halogen atom, an alkoxy group, an aryloxy group, and an amino group, wherein the bonding mode is Y—S(=O)$_2$—O-M, Y—C(=O)—O-M, Y—P(=O)(—OH)—O-M, Y—O-M, Y—S-M, Y—P(—R$^8$)(—R$^9$)=O-M, or Y—C(—R$^{10}$)=O-M, R$^5$ represents a substituent selected from the group consisting of a hydrogen atom, a halogen atom, a hydrocarbon group having 1 to 30 carbon atoms, a hydrocarbon group having 1 to 30 carbon atoms substituted with a halogen atom, a hydrocarbon group having 2 to 30 carbon atoms substituted with an alkoxy group having 1 to 10 carbon atoms, a hydrocarbon group having 7 to 30 carbon atoms substituted with an aryloxy group having 6 to 20 carbon atoms, a hydrocarbon group having 3 to 30 carbon atoms substituted with an amido group having 2 to 10 carbon atoms, an alkoxy group having 1 to 30 carbon atoms, an aryloxy group having 6 to 30 carbon atoms, and an acyloxy group having 2 to 10 carbon atoms, R$^6$ and R$^7$ each independently represent an alkoxy group, an aryloxy group, a silyl group, an amino group, or a hydrocarbon group having 1 to 120 carbon atoms which may be substituted with one or more groups selected from a halogen atom, an alkoxy group, and an aryloxy group, and may be bonded to each other to form a ring structure, L represents an electron-donating ligand and R$^5$ and L may form a ring, q is 0, ½, 1 or 2, n represents the number of charges of the metal complex represented by formula (C1) and is 0 or 1, Z$^{n-}$ represents a counteranion, and is absent when n is 0, as a catalyst, and by allowing a boron compound having one or more boron-hydrogen bonds (B—H) or boron-carbon bonds (B—C) to coexist during polymerization.

2. The method for producing a copolymer according to claim 1, wherein the boron compound having one or more boron-hydrogen bonds (B—H) or boron-carbon bonds (B—C) is a borane compound, a boroxine compound, a boronic acid compound, a boronic ester compound, a borinic acid compound, or a borinic ester compound.

3. The method for producing a copolymer according to claim 1, wherein the boron compound having one or more boron-hydrogen bonds (B—H) or boron-carbon bonds (B—C) is a boroxine compound represented by formula (2)

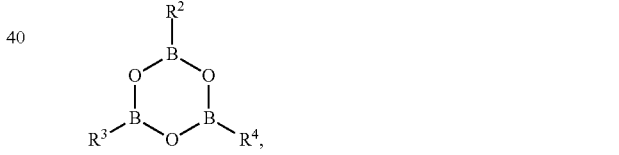  (2)

wherein R$^2$, R$^3$ and R$^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, a substituted or unsubstituted aryl group having 6 to 30 carbon atoms, and an acyloxy group having 2 to 10 carbon atoms, and at least one of R$^2$, R$^3$ and R$^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

4. The method for producing a copolymer according to claim 3, wherein R$^2$, R$^3$ and R$^4$ in formula (2) are each independently a hydrogen atom, a substituted or unsubstituted alkyl group having 1 to 30 carbon atoms, or a substituted or unsubstituted aryl group having 6 to 30 carbon atoms.

5. The method for producing a copolymer according to claim 1, wherein the metal complex is represented by formula (C2)

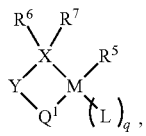

(C3)

wherein X, Y, M, L, q, $R^5$, $R^6$ and $R^7$ represent the same meanings as described in formula (C1) and $Q^1$ represents an anionic ligand selected from —S(=O)$_2$—O—, —C(=O)—O—, —P(=O)(—OH)—O—, —O—, and —S.

6. The method for producing a copolymer according to claim 5, wherein the metal complex is represented by formula (C4)

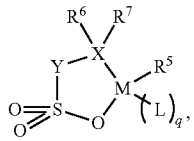

(C4)

wherein X, Y, M, L, q, $R^5$, $R^6$ and $R^7$ represent the same meanings as described in formula (C1).

7. The method for producing a copolymer according to claim 5, wherein Y in formula (C2) is a substituted or unsubstituted phenylene group, a substituted or unsubstituted methylene group, or a substituted or unsubstituted imino group.

8. The method for producing a copolymer according to claim 5, wherein $R^6$ and $R^7$ in formula (C2) are both an alkyl group having 3 to 20 carbon atoms.

9. The method for producing a copolymer according to claim 1, wherein the metal complex is represented by formula (C3)

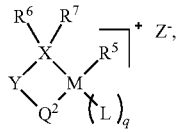

(C3)

wherein X, Y, M, L, q, $R^5$, $R^6$, $R^7$, and Z have the same meanings as described in formula (C1), and $Q^2$ represents a neutral ligand selected from —P(—$R^8$)(—$R^9$)=O, and —C(—$R^{10}$)=O, wherein $R^8$, $R^9$ and $R^{10}$ represent the same meanings as described in formula (C1).

10. The method for producing a copolymer according to claim 9, wherein Y in formula (C3) is a substituted or unsubstituted phenylene group, a substituted or unsubstituted methylene group, or a substituted or unsubstituted imino group.

11. The method for producing a copolymer according to claim 9, wherein $R^6$ and $R^7$ in formula (C3) are both an alkyl group having 3 to 20 carbon atoms.

12. The method for producing a copolymer according to claim 1, wherein Z in formula (C1) is one selected from SbF$_6$, BPh$_4$, BArF$_4$ (ArF$_4$=[3,5-(CF$_3$)$_2$C$_6$H$_3$]$_4$), BF$_4$ or PF$_6$.

13. The method for producing a copolymer according to claim 1, wherein the allyl monomer having a polar group represented by formula (1) is allyl acetate ($R^1$ in formula (1) is an acetoxy group (CH$_3$C(=O)—O—)).

14. The method for producing a copolymer according to claim 1, wherein, in a copolymerization reaction of ethylene and the allyl monomer having a polar group represented by formula (1), or in a copolymerization reaction of ethylene, the allyl monomer having a polar group represented by formula (1), and another monomer, the method comprises adding the boron compound having one or more boron-hydrogen bonds or boron-carbon bonds by continuous feed or intermittent feed after the start of the polymerization reaction.

15. The method for producing a copolymer according to claim 2, wherein the boron compound having one or more boron-hydrogen bonds (B—H) or boron-carbon bonds (B—C) is a boroxine compound represented by formula (2)

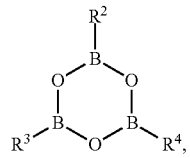

(2)

wherein $R^2$, $R^3$ and $R^4$ each independently represent a substituent selected from the group consisting of a hydrogen atom, a halogen atom, a hydroxy group, an amino group, an alkoxy group having 1 to 20 carbon atoms, an aryloxy group having 6 to 20 carbon atoms, a substituted amino group having 1 to 20 carbon atoms, a substituted or unsubstituted alkyl group having 1 to 30 carbon atoms, a substituted or unsubstituted cycloalkyl group having 3 to 30 carbon atoms, a substituted or unsubstituted aryl group having 6 to 30 carbon atoms, and an acyloxy group having 2 to 10 carbon atoms, and at least one of $R^2$, $R^3$ and $R^4$ is a hydrogen atom, a substituted or unsubstituted alkyl group having 1 to 30 carbon atoms, a substituted or unsubstituted cycloalkyl group having 3 to 30 carbon atoms, or a substituted or unsubstituted aryl group having 6 to 30 carbon atoms.

16. The method for producing a copolymer according to claim 15, wherein $R^2$, $R^3$ and $R^4$ in formula (2) are each independently a hydrogen atom, a substituted or unsubstituted alkyl group having 1 to 30 carbon atoms, or a substituted or unsubstituted aryl group having 6 to 30 carbon atoms.

* * * * *